United States Patent
Siomina et al.

(10) Patent No.: US 10,271,204 B2
(45) Date of Patent: *Apr. 23, 2019

(54) D2D AND CELLULAR OPERATION ON DIFFERENT CARRIER FREQUENCIES OR FREQUENCY BANDS

(71) Applicant: Telefonaktiebolaget LM Ericsson (publ), Stockholm (SE)

(72) Inventors: Iana Siomina, Täby (SE); Muhammad Kazmi, Bromma (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/960,653

(22) Filed: Apr. 24, 2018

(65) Prior Publication Data

US 2018/0242139 A1   Aug. 23, 2018

Related U.S. Application Data

(63) Continuation of application No. 14/773,932, filed as application No. PCT/SE2015/050854 on Aug. 6, 2015, now Pat. No. 9,986,423.

(60) Provisional application No. 62/035,726, filed on Aug. 11, 2014.

(51) Int. Cl.
| | | |
|---|---|---|
| *H04W 8/22* | (2009.01) | |
| *H04W 76/14* | (2018.01) | |
| *H04W 76/15* | (2018.01) | |
| *H04L 5/00* | (2006.01) | |
| *H04W 8/24* | (2009.01) | |
| *H04W 88/06* | (2009.01) | |

(52) U.S. Cl.
CPC .............. *H04W 8/22* (2013.01); *H04L 5/0094* (2013.01); *H04W 8/24* (2013.01); *H04W 76/14* (2018.02); *H04W 76/15* (2018.02); *H04L 5/001* (2013.01); *H04W 88/06* (2013.01)

(58) Field of Classification Search
USPC ......... 455/550.1, 552.1, 41.1–41.3, 450–455
See application file for complete search history.

(56) References Cited

U.S. PATENT DOCUMENTS

| | | | | |
|---|---|---|---|---|
| 8,504,052 B2 * | 8/2013 | Hakola | ................. | H04W 24/10 455/452.1 |
| 9,344,997 B2 * | 5/2016 | Lu | ....................... | H04W 76/043 |

(Continued)

OTHER PUBLICATIONS

Unknown, Author, "D2D Capability for Multi-Carrier Capable UE", 3GPP TSG-RAN WG2 #86, R2-142634, Seoul, Korea, May 19-23, 2014, pp. 1-3.

(Continued)

*Primary Examiner* — Fayyaz Alam
(74) *Attorney, Agent, or Firm* — Patent Portfolio Builders, PLLC

(57) ABSTRACT

The present disclosure pertains to a D2D enabled node for a wireless communication network, the D2D enabled node being adapted for a combination of carriers or bands comprising at least two carriers or bands (f1, f2), wherein the D2D enabled node is adapted to use at least one of the two carriers or bands (f1, f2) for D2D operation and at least one of the others of the at least two carriers or bands (f1, f2) for cellular operation. The disclosure also pertains to related devices and methods.

13 Claims, 6 Drawing Sheets

(56) References Cited

U.S. PATENT DOCUMENTS

| | | | | |
|---|---|---|---|---|
| 2011/0268004 A1* | 11/2011 | Doppler | .............. | H04W 72/02 |
| | | | | 370/311 |
| 2013/0230032 A1* | 9/2013 | Lu | .................. | H04W 76/023 |
| | | | | 370/336 |
| 2014/0075523 A1* | 3/2014 | Tuomaala | ............ | H04L 63/083 |
| | | | | 726/6 |
| 2016/0050698 A1* | 2/2016 | Siomina | .............. | H04W 8/005 |
| | | | | 370/329 |
| 2017/0013657 A1* | 1/2017 | Jung | .................. | H04W 76/14 |
| 2017/0048647 A1* | 2/2017 | Jung | .................. | H04W 76/14 |

OTHER PUBLICATIONS

Unknown, Author, "UE Capability Signaling for Multi-Carrier Capable UEs", 3GPP TSG-RAN WG2 #87, R2-143748, Dresden, Germany, LG Electronics Inc., Aug. 18-22, 2014, pp. 1-4.

* cited by examiner

D2D AND CELLULAR OPERATION ON DIFFERENT CARRIER FREQUENCIES OR FREQUENCY BANDS

RELATED APPLICATIONS

This application is a continuation of U.S. application Ser. No. 14/773,932 filed 9 Sep. 2015, which is a U.S. National Phase Application of PCT/SE2015/050854 filed 6 Aug. 2015, which claims benefit of U.S. Provisional Application No. 62/035,726 filed 11 Aug. 2014. The entire contents of each aforementioned application is incorporated herein by reference.

TECHNICAL FIELD

The present disclosure pertains to performing D2D and cellular operations utilizing carrier combinations in the context of wireless communication.

BACKGROUND

If D2D enabled nodes or UEs are in proximity to each other, they may be able to use a "direct mode" (e.g., as in FIG. 1) or "locally-routed" (e.g., as in FIG. 2) path for data communication, unlike in the conventional cellular communication (FIG. 3). In such device-to-device communication (D2D), which may also be called "ProSe" (for PROximity SErvices), the source and the target are wireless devices like D2D enabled nodes, e.g., UEs. Some of the potential advantages of D2D or ProSe are off-loading of the cellular network, faster communication, increased awareness of surrounding wireless devices of interest (e.g., running the same application), higher-quality links due to a shorter distance, etc. Some appealing applications of D2D communications are video streaming, online gaming, media downloading, peer-to-peer (P2P), file sharing, etc.

SUMMARY

The introduction of D2D capabilities into cellular systems provides a whole new set of challenges, e.g. in regards to using resources and/or providing efficient and reliable communication functionality.

One object of the present disclosure is to improve the D2D-related functionality of cellular devices.

There is disclosed a D2D enabled node for a wireless communication network. The D2D enabled node is adapted for a combination of carriers or bands comprising at least two carriers or bands, wherein the D2D enabled node is adapted to use at least one of the two carriers or bands for D2D operation and at least one of the others of the at least two carriers or bands for cellular operation. Accordingly, different carriers may be used for different functionalities.

Moreover, there is disclosed a (second) D2D enabled node for a wireless communication network. The D2D enabled node is adapted to receive capability information regarding another D2D enabled node, the capability information indicating at least one combination of carriers and/or bands on which the other D2D enabled node can be configured to simultaneously perform D2D and cellular operations.

In addition, a method for operating a D2D enabled node for a wireless communication network, the D2D enabled node (10) being adapted for a combination of carriers or bands comprising at least two carriers or bands (f1, f2), wherein the D2D enabled node uses at least one of the two carriers or bands (f1, f2) for D2D operation and at least one of the others of the at least two carriers or bands (f1, f2) for cellular operation.

Also, a method for operating a D2D enabled node is described, in which the method comprises receiving capability information regarding another D2D enabled node, the capability information indicating at least one combination of carriers and/or bands on which the other D2D enabled node can be configured to simultaneously perform D2D and cellular operations.

A network node for a wireless communication network may be considered. The network node is adapted for receiving, from a first D2D enabled node, a capability indication, which comprises capability information of the first D2D enabled node, wherein the capability information may indicate at least one combination of carriers and/or bands the first D2D enabled node may be adapted to be configured with for D2D and cellular operations.

There is suggested a method for operating a network node, the method comprising receiving, from a first D2D enabled node, a capability indication, which comprises capability information of the first D2D enabled node. The capability information may indicate at least one combination of carriers and/or bands the first D2D enabled node may be adapted to be configured with for D2D and cellular operations.

A computer program product comprising instructions executable by control circuitry is proposed, the instructions causing the control circuitry to carry out and/or control any one of the methods disclosed herein when executed by the control circuitry.

Moreover, a storage medium adapted to store instructions executable by control circuitry is disclosed, the instructions causing the control circuitry to carry out and/or control any one of the methods described herein.

BRIEF DESCRIPTION OF THE DRAWINGS

The drawings are provided to illuminate and illustrate concepts described herein, without limiting them to the subject matter shown in the figures, which show.

DETAILED DESCRIPTION

Generally, a UE may be considered as an example or representative of a D2D enabled node, and the term D2D enabled node may be interchanged for UE unless explicitly stated otherwise.

An eNB or base station may be considered to be one variant of a network node.

A multi-carrier or CA-capable D2D enabled node or UE supporting a band combination for CA may be not capable of using one of the bands comprised in the combination for D2D operation, even if the band is not used for cellular operation.

Figure 1:
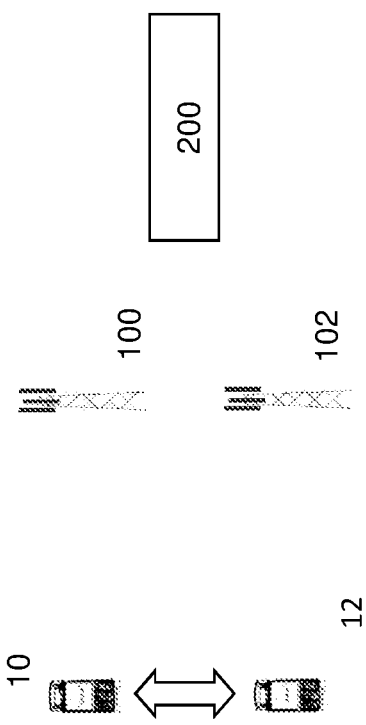
FIG. 1 a "Direct mode" data path in the EPS for communication between two UEs.
Figure 2:
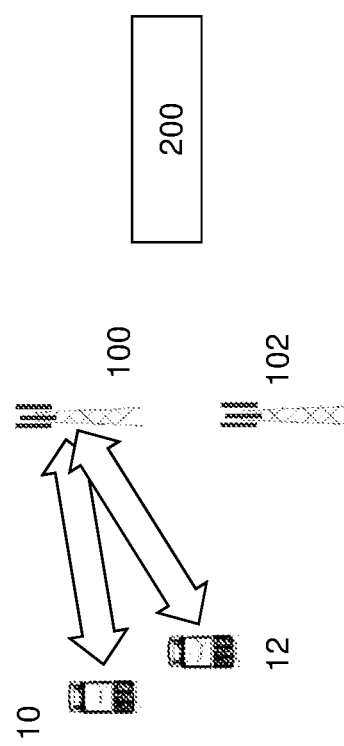
FIG. 2 a "Locally-routed" data path in the EPS for communication between two UEs when UEs are served by the same eNBs.
Figure 3:
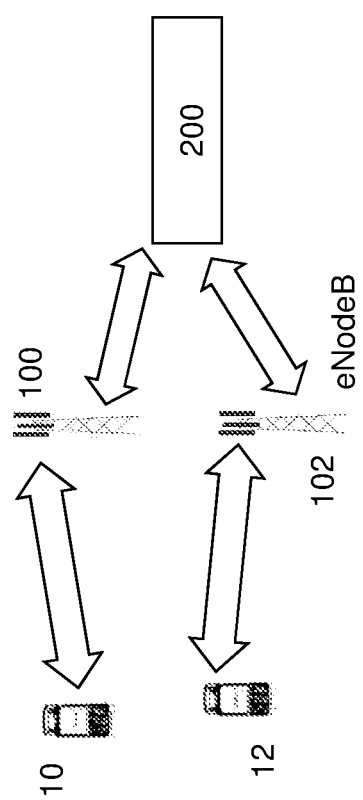
FIG. 3 a default data path scenario in the EPS for cellular communication between two UEs.

In FIGS. 1 to 3, there are shown different setups for communication of user equipments within a wireless communication network. In these figures, the first node or first user equipment UE1 is indicated with reference numeral 10, the second node or second user equipment is indicated with reference numeral 12. A first base station or network node, which may be an eNodeB and/or EPC according to LTE/E-UTRAN, carries the reference numeral 100, whereas a second base station, which may be an eNodeB and/or EPC according to LTE/UTRAN, is referenced with numeral 102. The nodes 100, 102 may be configured as coordinating nodes for D2D communication between the UEs 10, 12. Reference numeral 200 indicates higher layer functions or devices of the network, to which the base stations 100, 102 may be connected or connectable, e.g. LTE packet core elements like SGW (Server GateWay) and/or PGW (PDN GateWay) and/or MME (Mobility Management Entity).

If UEs 10, 12 are in proximity to each other, they may be able to use a "direct mode" (e.g., as in FIG. 1) or "locally-routed" (e.g., as in FIG. 2) path for data communication, unlike in the conventional cellular communication (FIG. 3).

Figure 4:
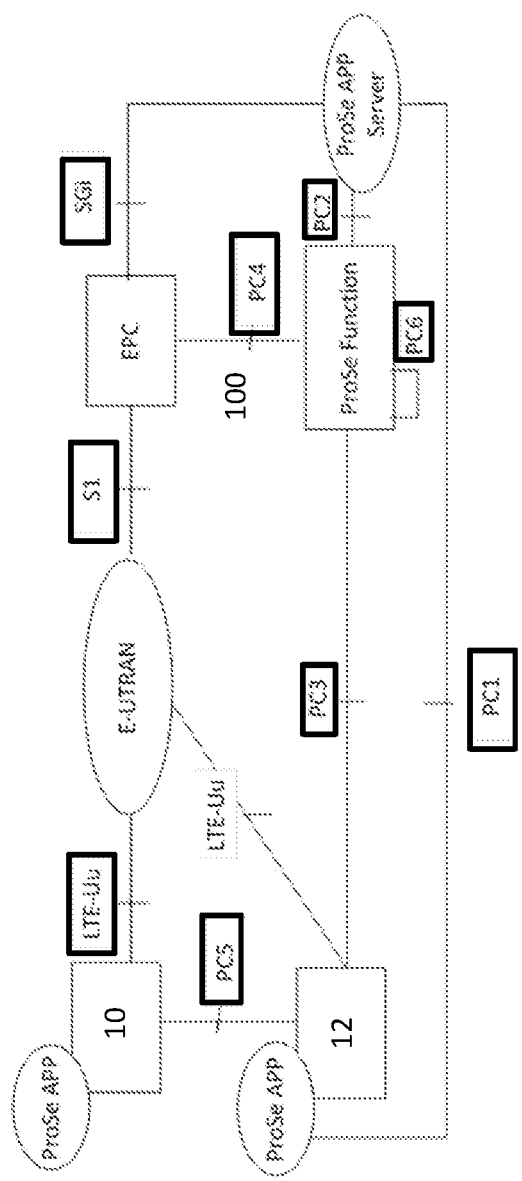
FIG. 4 an exemplary D2D architecture.

A more detailed example reference architecture for D2D operation according to one possible LTE/E-UTRAN implementation is illustrated in FIG. 4, in which only a setup with two UEs 10, 12 connected to a common base station or eNodeB 100 is shown. In FIG. 4, PCn identifies different reference points or interfaces. PC1 refers to a reference point between a ProSe application ProSe APP running on an D2D enabled node or UE 10 or 12, PC2 a reference point between an ProSe Application server and a ProSe function provider on a server or base station side. PC3 indicates a reference point between the D2D enabled node or UE 12 and the ProSE function, e.g. for discovery and/or communication. PC4 refers to a reference point between the EPC and the ProSe function, e.g. for setting up setting up one-to-one communication between UEs 10 and 12. PC5 is a reference point between D2D enabled node or UE 10 and D2D enabled node or UE 12, e.g. a first node and a second node involved in D2D communication, which may be used e.g. for direct or relayed communication between the UEs. PC6 identifies a reference point between ProSE functions of different networks, e.g. if UEs 10, 12 are subscribed to different PLMNs (Public Land Mobile Networks). SGi indicates an interface which may be used, inter alia, for application data and/or application level control. The EPC (Evolved Packet Core) may generally include a plurality of core packet functions or entities, e.g. MME, SGW, PWG, PCRF (Policy Charging and Rules Function), HSS (Home Subscriber Server), etc. E-UTRAN is the preferred RAT of the arrangement of FIG. 4. LTE-Uu indicates data transmission connections between the UEs 10, 12 and the base station 100.

Figure 5:
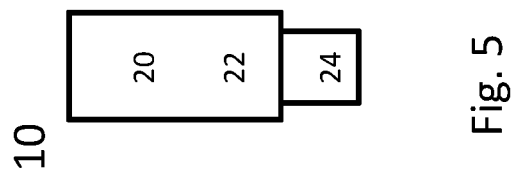
FIG. 5 an exemplary D2D enabled node.

FIG. 5 schematically shows a D2D enabled node or user equipment 10, which may be a node of a device-to-device communication, in closer details. User equipment 10 comprises control circuitry 20, which may comprise a controller connected to a memory. A receiving module and/or transmission module and/or control module may be implemented in the control circuitry 20, in particular as modules in the controller. The user equipment also comprises radio circuitry 22 providing receiving and transmitting or transceiving functionality, the radio circuitry 22 connected or connectable to the control circuitry. An antenna circuitry 24 of the user equipment 10 is connected or connectable to the radio circuitry 22 to collect or send and/or amplify signals. Radio circuitry 22 and the control circuitry 20 controlling it are configured for device-to-device communication, in particular utilizing E-UTRAN/LTE resources as described herein and/or receiving allocation data and/or transmit D2D data based on allocation data.

Figure 6:
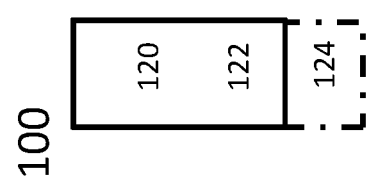
FIG. 6 an exemplary network node.

FIG. 6 schematically show a base station 100, which in particular may be an eNodeB. Base station 100 comprises control circuitry 120, which may comprise a controller connected to a memory. A configuring unit and/or a determination unit may be comprised in the control circuitry, the latter in particular if the base station is configured as a coordinating node. The control circuitry is connected to control radio circuitry 122 of the base station 100, which provides receiver and transmitter and/or transceiver functionality. It may be considered that control circuitry 120 comprises an extracting unit as described herein, in particular if the base station is configured to participate as a device in D2D communication. An antenna circuitry 124 may be connected or connectable to radio circuitry 122 to provide good signal reception or transmittance and/or amplification.

Each or any one of the user equipments shown in the figures may be adapted to perform the methods to be carried out by a user equipment or D2D enabled node described herein. Alternatively or additionally, each or any of the user equipments shown in the figures may comprise any one or any one combination of the features of a user equipment or D2D enabled node described herein. Each or any one of the network nodes or eNBs or base stations shown in the figures may be adapted to perform the methods to be carried out by network node or base station described herein. Alternatively or additionally, the each or any one of the network nodes or eNBs or base stations shown in the figures may comprise any one or any one combination of the features of a network node or eNB or base station described herein.

In systems with multiple carrier frequencies, a D2D enabled node or UE may operate over two or more carrier frequencies in parallel or in a sequential order, e.g., when performing measurements, transmitting or receiving radio signals or channels. Simultaneous or parallel operation over two or more carrier frequencies generally may require a higher complexity in the D2D enabled node or UE and a more complex receiver structure than operation in sequential order.

Inter-frequency operation generally may refer to operating, e.g. performing measurements (e.g., inter-frequency RSRP/RSRQ and RSTD) and/or receiving broadcast channels (e.g., system information reading on PBCH), on a carrier frequency which is different from the serving frequency(-ies). A D2D enabled node or UEs with a single receiver chain normally require measurement gaps for inter-frequency operation; other D2D enabled node or UEs may be always or in certain conditions capable of inter-frequency operation without measurement gaps.

The difference of CA (carrier aggregation) to inter-frequency operation is that in carrier aggregation, the D2D enabled node or UE has a possibility of operating over multiple serving cells or on a serving cell(s) which are not the primary serving cell.

In such multi-carrier or carrier aggregation cellular system, a carrier is generally termed as a component carrier (CC) or sometimes is also referred to as cell or serving cell. In principle each CC has multiple cells. The term carrier aggregation (CA) is also called (e.g. interchangeably called) "multi-carrier system", "multi-cell operation", "multi-carrier operation", "multi-carrier" transmission and/or reception.

This means that CA may be used for transmission of signalling and data in the uplink and/or downlink directions. One of the CCs is the primary component carrier (PCC), which may also be referred to as simply primary carrier or anchor carrier and which may define or correspond to a primary cell (PCell). The remaining CCs are called secondary component carrier (SCC) or simply secondary carriers or even supplementary carriers and may define or correspond to one or more secondary cells or serving cells (SCell). Generally, the primary or anchor CC may carry the essential D2D enabled node or UE specific signalling and/or control data. A primary CC (aka PCC or PCell) may exists in both uplink and downlink directions in CA. In case there is single UL CC, the PCell may be on that CC. The network may assign different primary carriers to different D2D enabled nodes or UEs operating in the same sector or cell. Generally, the term cell may refer to a PCell or a SCell.

There is generally disclosed a (first) D2D enabled node for a wireless communication network. The D2D enabled node may be adapted for a combination of carriers or bands comprising at least two carriers or bands, wherein the D2D enabled node is adapted to use at least one of the two carriers or bands for D2D operation (e.g., utilizing a D2D module of the D2D enabled node) and at least one of the others of the at least two carriers or bands for cellular operation (e.g., utilizing a cellular module of the D2D enabled node). Accordingly, the D2D enabled node may utilize D2D operation and cellular operation simultaneously or essentially parallel with low or no interference.

The D2D enabled node may be adapted for obtaining capability information comprising or indicating at least one combination of carriers and/or bands, wherein the D2D enabled node is adapted to be configured for simultaneous D2D and cellular operations with the combination. This information may be used for operating the D2D enabled node and/or may be made available to the network or another D2D enabled node, e.g. for improved communication performance or efficiency.

It may be considered that the D2D enabled node is adapted for transmitting capability information (e.g., utilizing a transmitting module of the D2D enabled node) regarding the capabilities of the D2D enabled node to a network node and/or to a second D2D enabled node, wherein the capability information may indicate a combination of carriers and/or frequency bands on which the D2D enabled node can be configured to simultaneously perform D2D and cellular operations. Thus, the network or another node interested in D2D operation may perform corresponding adaptions and/or configurations, taking into account the D2D enabled node's capabilities, e.g. to avoid collisions in used and/or requested resources.

Moreover, there may be considered a (second) D2D enabled node for a wireless communication network, the D2D enabled node being adapted to receive (e.g., utilizing a receiving module of the D2D enabled node) capability information regarding another D2D enabled node, the capability information indicating at least one combination of carriers and/or bands on which the other D2D enabled node can be configured to simultaneously perform D2D and cellular operations. The other D2D enabled node may be a (first) D2D enabled node as described herein. The described (second) D2D enabled node may consequently operate more efficiently based on the received information, informing it about D2D-related capabilities of the other node.

In particular, the (second) D2D enabled node may be adapted to request the capability information. Thus, the information may be made available when needed, limiting the amount of unsolicited traffic.

There is also disclosed a method for operating a D2D enabled node for a wireless communication network. The D2D enabled node may be adapted for a combination of carriers or bands comprising at least two carriers or bands, wherein the D2D enabled node uses at least one of the two carriers or bands for D2D operation and at least one of the others of the at least two carriers or bands for cellular operation.

It may be considered that the method further comprises obtaining capability information comprising at least one combination of carriers and/or bands, wherein the D2D enabled node can be configured to perform simultaneous D2D and cellular operations with the combination.

Alternatively or additionally, the method may further comprise transmitting capability information regarding the capabilities of the D2D enabled node to a network node and/or to a second D2D enabled node, wherein the capability information may indicate a combination of carriers and/or frequency bands on which the D2D enabled node can be configured to simultaneously perform D2D and cellular operations.

A further method for operating a D2D enabled node may be considered. The method may comprise receiving capability information regarding another D2D enabled node, the capability information indicating at least one combination of carriers and/or bands on which the other D2D enabled node can be configured to simultaneously perform D2D and cellular operations.

The method may comprise requesting the capability information.

A network node for a wireless communication network is disclosed. The network node may be adapted for receiving (e.g., utilizing a receiving module of the network node), from a first D2D enabled node, a capability indication. The capability indication may comprise capability information of the first D2D enabled node, wherein the capability information may indicate at least one combination of carriers and/or bands the first D2D enabled node may be adapted to be configured with the combination of carriers and/or bands for D2D and cellular operations.

The network node may be adapted for using the received capability information for one or more radio operational tasks.

A method for operating a network node is also disclosed. The method may comprise receiving, from a first D2D enabled node, a capability indication, which comprises capability information of the first D2D enabled node, wherein the capability information may indicate at least one combination of carriers and/or bands the first D2D enabled node may be adapted to be configured with for D2D and cellular operations.

The method further may comprise using the received capability information for one or more radio operational tasks.

Moreover, there is described a computer program product comprising instructions executable by control circuitry, the instructions causing the control circuitry to carry out and/or control any one of the methods described herein when executed by the control circuitry.

In addition, a storage medium is described. The storage medium is adapted to store instructions executable by control circuitry, the instructions causing the control circuitry to carry out and/or control any one of the methods described herein.

For LTE cellular networks, a D2D enabled node or UE may be designed to support any of the E-UTRA operating bands listed in table 1 below; which may be used or usable for cellular and/or D2D operation.

TABLE 1

| | Uplink (UL) operating band BS receive UE transmit | Downlink (DL) operating band BS transmit UE receive | |
|---|---|---|---|
| E-UTRA Operating Band | $F_{UL\_low}$-$F_{UL\_high}$ | $F_{DL\_low}$-$F_{DL\_high}$ | Duplex Mode |

E-UTRA operating bands [3GPP TS 36.101, v12.3.0]

| E-UTRA Operating Band | Uplink (UL) operating band | Downlink (DL) operating band | Duplex Mode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894 MHz | FDD |
| 6[1] | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1447.9 MHz | 1475.9 MHz-1495.9 MHz | FDD |
| 12 | 699 MHz-716 MHz | 729 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz-862 MHz | 791 MHz-821 MHz | FDD |
| 21 | 1447.9 MHz-1462.9 MHz | 1495.9 MHz-1510.9 MHz | FDD |
| 22 | 3410 MHz-3490 MHz | 3510 MHz-3590 MHz | FDD |
| 23 | 2000 MHz-2020 MHz | 2180 MHz-2200 MHz | FDD |
| 24 | 1626.5 MHz-1660.5 MHz | 1525 MHz-1559 MHz | FDD |
| 25 | 1850 MHz-1915 MHz | 1930 MHz-1995 MHz | FDD |
| 26 | 814 MHz-849 MHz | 859 MHz-894 MHz | FDD |
| 27 | 807 MHz-824 MHz | 852 MHz-869 MHz | FDD |
| 28 | 703 MHz-748 MHz | 758 MHz-803 MHz | FDD |
| 29 | N/A | 717 MHz-728 MHz | FDD2 |
| 30 | 2305 MHz-2315 MHz | 2350 MHz-2360 MHz | FDD |
| 31 | 452.5 MHz-457.5 MHz | 462.5 MHz-467.5 MHz | FDD |
| . . . | | | |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |
| 41 | 2496 MHz 2690 MHz | 2496 MHz 2690 MHz | TDD |
| 42 | 3400 MHz-3600 MHz | 3400 MHz-3600 MHz | TDD |
| 43 | 3600 MHz-3800 MHz | 3600 MHz-3800 MHz | TDD |
| 44 | 703 MHz-803 MHz | 703 MHz-803 MHz | TDD |

NOTE 1:

Band 6 is not applicable

NOTE 2:

Restricted to E-UTRA operation when carrier aggregation is configured. The downlink operating band is paired with the uplink operating band (external) of the carrier aggregation configuration that is supporting the configured Pcell.

For a D2D enabled node or UE to support CA over a band combination, it is not sufficient that the D2D enabled node or UE supports just every single band in the combination, but it has to support also the band combination which is often determined by band-combination-specific additional RF requirements.

Below are the operating band combinations that a D2D enabled node or UE may support for intra-band contiguous and non-contiguous CA and for inter-band CA.

TABLE 2

| Intra-band contiguous CA operating bands | | | | |
|---|---|---|---|---|
| E-UTRA CA Band | E-UTRA Band | Uplink (UL) operating band BS receive/UE transmit FUL_low-FUL_high | Downlink (DL) operating band BS transmit/UE receive FDL_low-FDL_high | Duplex Mode |
| CA_1 | 1 | 1920 MHz-1980 MHz | 2110 MHz-2170 MHz | FDD |
| CA_3 | 3 | 1710 MHz-1785 MHz | 1805 MHz-1880 MHz | FDD |

TABLE 2-continued

| Intra-band contiguous CA operating bands | | | | |
|---|---|---|---|---|
| E-UTRA CA Band | E-UTRA Band | Uplink (UL) operating band BS receive/UE transmit FUL_low-FUL_high | Downlink (DL) operating band BS transmit/UE receive FDL_low-FDL_high | Duplex Mode |
| CA_7 | 7 | 2500 MHz-2570 MHz | 2620 MHz-2690 MHz | FDD |
| CA_23 | 23 | 2000 MHz-2020 MHz | 2180 MHz-2200 MHz | FDD |
| CA_27 | 27 | 807 MHz-824 MHz | 852 MHz-869 MHz | FDD |
| CA_38 | 38 | 2570 MHz-2620 MHz | 2570 MHz-2620 MHz | TDD |
| CA_39 | 39 | 1880 MHz-1920 MHz | 1880 MHz-1920 MHz | TDD |
| CA_40 | 40 | 2300 MHz-2400 MHz | 2300 MHz-2400 MHz | TDD |
| CA_41 | 41 | 2496 MHz-2690 MHz | 2496 MHz-2690 MHz | TDD |

TABLE 3

| Inter-band CA operating bands | | | | |
|---|---|---|---|---|
| E-UTRA CA Band | E-UTRA Band | Uplink (UL) operating band BS receive/UE transmit FUL_Low-FUL_high | Downlink (DL) operating band BS transmit/UE receive FDL_low-FDL_high | Duplex Mode |
| CA_1-5 | 1 | 1920 MHz-1980 MHz | 2110 MHz-2170 MHz | FDD |
|  | 5 | 824 MHz-849 MHz | 869 MHz-894 MHz |  |
| CA_1-8 | 1 | 1920 MHz-1980 MHz | 2110 MHz-2170 MHz | FDD |
|  | 8 | 880 MHz-915 MHz | 925 MHz-960 MHz |  |
| CA_1-18 | 1 | 1920 MHz-1980 MHz | 2110 MHz-2170 MHz | FDD |
|  | 18 | 815 MHz-830 MHz | 860 MHz-875 MHz |  |
| CA_1-19 | 1 | 1920 MHz-1980 MHz | 2110 MHz-2170 MHz | FDD |
|  | 19 | 830 MHz-845 MHz | 875 MHz-890 MHz |  |
| CA_1-21 | 1 | 1920 MHz-1980 MHz | 2110 MHz-2170 MHz | FDD |
|  | 21 | 1447.9 MHz-1462.9 MHz | 1495.9 MHz-1510.9 MHz |  |
| CA_1-26 | 1 | 1920 MHz-1980 MHz | 2110 MHz-2170 MHz | FDD |
|  | 26 | 814 MHz-849 MHz | 859 MHz-894 MHz |  |
| CA_2-4 | 2 | 1850 MHz-1910 MHz | 1930 MHz-1990 MHz | FDD |
|  | 4 | 1710 MHz-1755 MHz | 2110 MHz-2155 MHz |  |
| CA_2-5 | 2 | 1850 MHz-1910 MHz | 1930 MHz-1990 MHz | FDD |
|  | 5 | 824 MHz-849 MHz | 869 MHz-894 MHz |  |
| CA_2-12 | 2 | 1850 MHz-1910 MHz | 1930 MHz-1990 MHz | FDD |
|  | 12 | 699 MHz-716 MHz | 729 MHz-746 MHz |  |
| CA_2-13 | 2 | 1850 MHz-1910 MHz | 1930 MHz-1990 MHz | FDD |
|  | 13 | 777 MHz-787 MHz | 746 MHz-756 MHz |  |
| CA_2-17 | 2 | 1850 MHz-1910 MHz | 1930 MHz-1990 MHz | FDD |
|  | 17 | 704 MHz-716 MHz | 734 MHz-746 MHz |  |
| CA_2-29 | 2 | 1850 MHz-1910 MHz | 1930 MHz-1990 MHz | FDD |
|  | 29 | N/A | 717 MHz-728 MHz |  |
| CA_3-5 | 3 | 1710 MHz-1785 MHz | 1805 MHz-1880 MHz | FDD |
|  | 5 | 824 MHz-849 MHz | 869 MHz-894 MHz |  |
| CA_3-7 | 3 | 1710 MHz-1785 MHz | 1805 MHz-1880 MHz | FDD |
|  | 7 | 2500 MHz-2570 MHz | 2620 MHz-2690 MHz |  |
| CA_3-8 | 3 | 1710 MHz-1785 MHz | 1805 MHz-1880 MHz | FDD |
|  | 8 | 880 MHz-915 MHz | 925 MHz-960 MHz |  |
| CA_3-19 | 3 | 1710 MHz-1785 MHz | 1805 MHz-1880 MHz | FDD |
|  | 19 | 830 MHz-845 MHz | 875 MHz-890 MHz |  |
| CA_3-20 | 3 | 1710 MHz-1785 MHz | 1805 MHz-1880 MHz | FDD |
|  | 20 | 832 MHz-862 MHz | 791 MHz-821 MHz |  |
| CA_3-26 | 3 | 1710 MHz-1785 MHz | 1805 MHz-1880 MHz | FDD |
|  | 26 | 814 MHz-849 MHz | 859 MHz-894 MHz |  |
| CA_3-27 | 3 | 1710 MHz-1785 MHz | 1805 MHz-1880 MHz | FDD |
|  | 27 | 807 MHz-824 MHz | 852 MHz-869 MHz |  |
| CA_3-28 | 3 | 1710 MHz-1785 MHz | 1805 MHz-1880 MHz | FDD |
|  | 28 | 703 MHz-748 MHz | 758 MHz-803 MHz |  |
| CA_4-5 | 4 | 1710 MHz-1755 MHz | 2110 MHz-2155 MHz | FDD |
|  | 5 | 824 MHz-849 MHz | 869 MHz-894 MHz |  |
| CA_4-7 | 4 | 1710 MHz-1755 MHz | 2110 MHz-2155 MHz |  |
|  | 7 | 2500 MHz-2570 MHz | 2620 MHz-2690 MHz | FDD |
| CA_4-12 | 4 | 1710 MHz-1755 MHz | 2110 MHz-2155 MHz | FDD |
|  | 12 | 699 MHz-716 MHz | 729 MHz-746 MHz |  |
| CA_4-13 | 4 | 1710 MHz-1755 MHz | 2110 MHz-2155 MHz | FDD |
|  | 13 | 777 MHz-787 MHz | 746 MHz-756 MHz |  |

TABLE 3-continued

Inter-band CA operating bands

| E-UTRA CA Band | E-UTRA Band | Uplink (UL) operating band BS receive/UE transmit FUL_Low-FUL_high | Downlink (DL) operating band BS transmit/UE receive FDL_low-FDL_high | Duplex Mode |
|---|---|---|---|---|
| CA_4-17 | 4 | 1710 MHz-1755 MHz | 2110 MHz-2155 MHz | FDD |
|  | 17 | 704 MHz-716 MHz | 734 MHz-746 MHz |  |
| CA_4-29 | 4 | 1710 MHz-1755 MHz | 2110 MHz-2155 MHz | FDD |
|  | 29 | N/A | 717 MHz-728 MHz |  |
| CA_5-7 | 5 | 824 MHz-849 MHz | 869 MHz-894 MHz | FDD |
|  | 7 | 2500 MHz-2570 MHz | 2620 MHz-2690 MHz |  |
| CA_5-12 | 5 | 824 MHz-849 MHz | 869 MHz-894 MHz | FDD |
|  | 12 | 699 MHz-716 MHz | 729 MHz-746 MHz |  |
| CA_5-17 | 5 | 824 MHz-849 MHz | 869 MHz-894 MHz | FDD |
|  | 17 | 704 MHz-716 MHz | 734 MHz-746 MHz |  |
| CA_5-25 | 5 | 824 MHz-849 MHz | 869 MHz-894 MHz | FDD |
|  | 25 | 1850 MHz-1915 MHz | 1930 MHz-1995 MHz |  |
| CA_7-20 | 7 | 2500 MHz-2570 MHz | 2620 MHz-2690 MHz | FDD |
|  | 20 | 832 MHz-862 MHz | 791 MHz-821 MHz |  |
| CA_7-28 | 7 | 2500 MHz-2570 MHz | 2620 MHz-2690 MHz | FDD |
|  | 28 | 703 MHz-748 MHz | 758 MHz-803 MHz |  |
| CA_8-20 | 8 | 880 MHz-915 MHz | 925 MHz-960 MHz | FDD |
|  | 20 | 832 MHz-862 MHz | 791 MHz-821 MHz |  |
| CA_11-18 | 11 | 1427.9 MHz-1447.9 MHz | 1475.9 MHz-1495.9 MHz | FDD |
|  | 18 | 815 MHz-830 MHz | 860 MHz-875 MHz |  |
| CA12-25 | 12 | 699 MHz-716 MHz | 729 MHz-746 MHz | FDD |
|  | 25 | 1850 MHz-1915 MHz | 1930 MHz-1995 MHz |  |
| CA_19-21 | 19 | 830 MHz-845 MHz | 875 MHz-890 MHz | FDD |
|  | 21 | 1447.9 MHz-1462.9 MHz | 1495.9 MHz-1510.9 MHz |  |
| CA_23-29 | 23 | 2000 MHz-2020 MHz | 2180 MHz-2200 MHz | FDD |
|  | 29 | N/A | 717 MHz-728 MHz |  |
| CA_39-41 | 39 | 1880 MHz-1920 MHz | 1880 MHz-1920 MHz | TDD |
|  | 40 | 2496 MHz-2690 MHz | 2496 MHz-2690 MHz |  |

TABLE 4

Intra-band non-contiguous CA operating bands

| E-UTRA CA Band | E-UTRA Band | Uplink (UL) operating band BS receive/UE transmit FUL_low-FUL_high | Downlink (DL) operating band BS transmit/UE receive FDL_low-FDL-high | Duplex Mode |
|---|---|---|---|---|
| CA_3-3 | 3 | 1710 MHz-1785 MHz | 1805 MHz-1880 MHz | FDD |
| CA_4-4 | 4 | 1710 MHz-1755 MHz | 2110 MHz-2155 MHz | FDD |
| CA_7-7 | 7 | 2500 MHz-2570 MHz | 2620 MHz-2690 MHz | FDD |
| CA_23-23 | 23 | 2000 MHz-2020 MHz | 2180 MHz-2200 MHz | FDD |
| CA_25-25 | 25 | 1850 MHz-1915 MHz | 1930 MHz-1995 MHz | FDD |
| CA_41-41 | 41 | 2496 MHz-2690 MHz | 2496 MHz-2690 MHz | TDD |

So far, only capabilities of a D2D enabled node or UE for single-band D2D operation have been discussed. There may also be D2D-dedicated bands, e.g., a public safety band supporting only D2D operation but no cellular operation.

In this setup, a CA-capable D2D enabled node or UE supporting a band combination for CA may be not capable of using for D2D operation one of the bands comprised in the combination, even if the band is not currently used for cellular operation.

The D2D enabled node or UE may have DL CA capability and no UL CA capability or it may have support for CA in both DL and UL, but not necessarily exactly for the same set of bands and/or band combinations.

There may be considered a first D2D enabled node or UE, which signals and/or is adapted to signal, to a network node and/or to a second D2D enabled node or UE, a capability indication or indication message. The capability indication or indication message may provide capabilities information, which may indicate explicitly or implicitly a combination of carriers and/or frequency bands on which the first D2D enabled node or UE can be configured and/or is operable in and/or adapted to operate in, to simultaneously perform D2D and cellular operations. For example, the indication or indication message may indicate a combination of carriers f1 and f2, for D2D and cellular operations respectively. The network node may configure and/or be adapted to configure, based on the received capability information, the first D2D enabled node or UE with carriers for D2D and cellular operations. There are described methods in and/or which may be performed by a network node, a first D2D enabled node or UE and/or in a second D2D enabled node or UE; the network node, first D2D enabled node or UE and/or second D2D enabled node or UE may correspondingly adapted to carry out any one or any one combination of the methods respectively associated to them.

A first D2D enabled node or UE, which may be served or managed by a network node, may be adapted to perform and/or perform a method with one or more than one of the following:

Transmitting capability information to a network node and/or to a second D2D enabled node or UE, e.g. in form of a capability indication or capability indication message. The capability indication and/or indication message may comprise parameters and/or parameter values and/or indication and/or information regarding the capabilities of the first D2D enabled node. In particular, the capability indication or indication message may provide capabilities information, which may indicate explicitly or implicitly a combination of carriers and/or frequency bands on which the first D2D enabled node or UE can be configured and/or is operable in and/or adapted to operate in, to simultaneously perform D2D and cellular operations.

Optionally, obtaining capability information of the first D2D enabled node or UE, said capability information comprising at least one combination of carrier frequencies and/or frequency bands (aka more general: band combination), wherein the first D2D enabled node or UE can be simultaneously configured with the said combination of carrier frequencies and/or frequency bands for D2D and cellular operations.

Generally, throughout this description, a or each band combination or combination of carrier frequencies and/or frequency bands may comprise at least two carriers or bands, wherein from the at least two carriers or bands at least one can be used and/or configured (by the corresponding D2D enabled node or UE, which may be adapted for the corresponding use) for D2D operation, whereas at least one of the others can be used and/or configured for cellular operation (by the corresponding D2D enabled node or UE, which may be adapted for the corresponding use); the combination may refer to simultaneous use.

A network node, which may be serving, or managing operation, of a first D2D enabled node or UE, may perform and/or be adapted to perform:

Receiving, from a first D2D enabled node or UE, a capability indication or indication message, which may comprise capability information of the first D2D enabled node or UE, wherein the capability information may comprise or indicate a, at least one, or a plurality of combination/s of carrier frequencies and/or frequency bands (aka band combination). The first D2D enabled node or UE may be adapted to be, or can be, configured, in particular simultaneously configured, with the combination/s of carrier frequencies and/or frequency bands for D2D and cellular operations, in particular for simultaneous D2D and cellular operations. The combination/s may comprise of at least two carriers or bands, out of which one can be used and/or configured for D2D operation whereas the other one can be used and/or configured for cellular operation;

Using the received capability information for one or more radio operational tasks (e.g. configuring the first D2D enabled node or UE with carriers for D2D and cellular operations, forwarding capability information to another D2D enabled node or UE and/or network node etc).

A network device may comprise a NW receiving module for receiving a capability indication or indication message, in particular as described herein. Alternatively or additionally, the network device may comprise a NW information use module for using the received capability information, in particular as described herein. Alternatively or additionally, the network device may comprise a NW configuration module for configuring a D2D enabled node or UE, in particular a first D2D enabled node or UE, as described herein. The NW configuration module may be part of the NW information use module or the NW information use module may be implemented as NW configuration module.

Methods of a D2D enabled node or UE adapting the radio configuration to support Scenarios 1 and/or 2 are also described herein, as well as methods in a network node for controlling the adaptation. There are also described a correspondingly adapted network node and/or D2D enabled node or UE.

The following scenarios are described herein, which may be covered by embodiments as disclosed:

Scenario 1: A D2D enabled node or UE is supporting/capable/can perform, and may be configured for, simultaneous D2D operation on f1 and cellular DL operation on f2. It may be considered that optionally the D2D enabled node or UE is supporting/capable/can perform, and may be configured for, cellular DL operation on at least one additional carrier or band f3 (wherein f1, f2, and f3 are all different).

Scenario 2: A D2D enabled node or UE is supporting and may be simultaneously configured for D2D operation on f1 and cellular UL operation on f2 and possibly on at least one f3 (f1, f2, and f3 are all different).

A D2D enabled node or UE is supporting/capable/can perform, and may be configured for, simultaneous D2D operation on f1 and cellular UL operation on f2. It may be considered that optionally the D2D enabled node or UE is supporting/capable/can perform, and may be configured for, cellular UL operation on at least one additional carrier or band f3 (wherein f1, f2, and f3 are all different).

The scenarios may be mixed such that the D2D enabled node or UE may be supporting/capable/can perform, and may be configured for, simultaneous D2D operation on f1 and cellular DL operation on f2 and cellular UL operation on f3 (wherein f1, f2, and f3 are all different); there may be optionally cellular UL operation and/or cellular DL operation on one or more additional carriers f4. Generally, simultaneous operation may include silent gaps on one or more than one of the carriers, during which the D2D enabled node or UE may be kept in a state capable for the operations mentioned. Simultaneously configured or configured for simultaneous operation may mean that the D2D enabled node or UE is configured for D2D and cellular operations. But the D2D enabled node or UE may perform D2D and cellular operations during the same or fully or partly overlapping time instances or even at different times, e.g., subframes, radio frames, slots, etc. For example a D2D enabled node or UE that has a single radio receiver may be able to perform cellular and D2D operations during different times. But a D2D enabled node or UE that has a multiple or independent radio receivers or additional radio receiver circuitry or hardware resources may be able to perform cellular and D2D operations during the same time or partly overlapping time.

In the above, f1 and/or f2 (f3, f4, etc.) may comprise a carrier frequency or frequency band. f1 and f2, or generally, different carrier frequencies or bands may be associated with the same or different RAT.

If the D2D enabled node or UE is CA-capable, the combination (f1, f2) (or (f1, f2, f3, ... f_i, ... ), depending on the CA capability of the D2D enabled node or UE) may (in one embodiment) or may not (in another embodiment) be comprised in combinations supported by the D2D enabled node or UE for CA, incl. intra-band CA contiguous and non-contiguous and inter-band CA.

Generally, if a D2D enabled node or UE is supporting D2D operation on f1, then it may be capable of, and/or configured/adapted for, D2D transmission and D2D reception on f1, although during the D2D operation D2D transmission or D2D reception or both may be configured at any given time. In the 3GPP standard, D2D transmission and reception can occur only in the UL spectrum, i.e., f1 is comprised in the UL spectrum; however, the current disclosure is not limited f1 to the UL spectrum only.

According to a variant, a first D2D enabled node or UE is capable of supporting Scenario 1 and/or Scenario 2 above. The description herein is focusing on combination (f1,f2), but may also be extended in a similar way to (f1,f2,f3).

The capability may be comprised in a standard D2D capability, i.e., all D2D enabled node or UE may be required to also support Scenario 1 and/or Scenario 2 on the bands where they support D2D and cellular operation. In another embodiment, not all D2D enabled nodes or UEs may be required to support Scenarios 1 & 2 on the bands where they support D2D and cellular operation. In yet another example, not all D2D-capable D2D enabled node or UEs which are capable of supporting D2D operation on f1 and cellular operation on f2 are also capable of supporting their simultaneous operation.

In one variant, the capability to support Scenarios 1 or 2 may be described by a table listing explicitly the frequency/band combinations supported for Scenarios 1 and/or 2, where f1 and f2 (f1,f2=A, B, C, . . . ) are carrier frequencies (in one example) or operating bands (in another example). The table examples are Table 5 and Table 6. Table 7 shows an example for combinations of three carrier frequencies/bands. IN the tables, UE may be seen to represent a D2D enabled node or UE.

TABLE 5

Combinations of (f1, f2) of which a UE is capable of supporting Scenario 1

| f1 for D2D operation | f2 for Cellular DL operation |
|---|---|
| A | A |
| A | B |
| B | C |
| C | D |
| D | C |

TABLE 6

Combinations of (f1, f2) of which a UE is capable of supporting Scenario 2

| f1 for D2D operation | f2 for Cellular UL operation |
|---|---|
| A | A |
| B | A |
| B | C |
| C | B |

TABLE 7

Combinations of (f1, f2, f3) of which a UE is capable of supporting Scenario 1 (e.g. multicarrier or CA cellular operation on (f2, f3) in addition to D2D operation on f1)

| f1 for D2D operation | f2 for Cellular DL operation | f3 for Cellular DL operation |
|---|---|---|
| A | A | E |
| A | B | D |
| B | C | A |
| C | D | F |

TABLE 7-continued

Combinations of (f1, f2, f3) of which a UE is capable of supporting Scenario 1 (e.g. multicarrier or CA cellular operation on (f2, f3) in addition to D2D operation on f1)

| f1 for D2D operation | f2 for Cellular DL operation | f3 for Cellular DL operation |
|---|---|---|
| D | C | B |
| A | A | A |

In another embodiment, the set of supported frequency/band combinations can be described implicitly, e.g., by means of conditions that the frequency/band combinations shall meet (see below e.g. conditions with dynamic or semi-dynamic capability).

In one example, the capability may be a static capability property of the D2D enabled node or UE apparatus, e.g., when the D2D enabled node or UE has a fixed RF configuration (e.g., fixed receiver-transmitter separation). In another example, the D2D enabled node or UE may have this capability only in certain conditions, e.g., when any one or more of the below apply. It may be considered that the D2D enabled node or UE obtains and/or transmits and/or is adapted to obtain and/or transmit capability information and/or capability indication or indication message based on or more of the following conditions.

Additionally or alternatively, it may be considered that a network node configures and/or is adapted to configure a D2D enabled node or UE based on or more of the following conditions. The network node may be adapted to determine fulfillment of the conditions based on capability information received from the D2D enabled node or UE, e.g. in a capability indication or indication message.

A D2D device may comprise a condition module for determining fulfillment of one or more than one of the following conditions, which may be operatively connected or connectable to a obtaining module and/or transmission module as described above for transmitting information regarding the capabilities of the D2D enabled node or UE based on the conditions. Alternatively or additionally, a network device may comprise a NW condition module for determining fulfillment of one or more than one of the following conditions. The NW condition module may be part of a NW configuration module. Alternatively or additionally, a NW configuration module may be adapted for configuring the D2D enabled node or UE based on one or more of the following conditions and/or their fulfillment. The conditions may comprise:

Out-of-band emissions or inter-carrier interference from f1 to f2 do not exceed a first threshold and/or from f2 to f1 does not exceed a second threshold.

Interference on f1 is below a first interference threshold and/or interference on f2 is below a second interference threshold.

In Scenario 2, the transmit power of the D2D enabled node or UE does not exceed a power threshold which is smaller than the maximum output D2D enabled node or UE power.

Depending on the duplex distance of the frequency band to which f1 and f2 belong. For example if duplex distance is above a duplex threshold then any of f1 and f2 can be used for D2D or cellular operations.

Depending on the Rx-Tx separation (i.e. distance between UL and DL carriers) of the frequency band to which f1 and f2 belong. For example if Rx-Tx separation is above a separation threshold then any of f1 and f2 can be used for D2D or cellular operations.

Depending on the passband (frequency range in UL or DL) of the frequency band to which f1 and f2 belong. For example if the passband is above a passband threshold then any of f1 and f2 can be used for D2D or cellular operations.

In yet another example, the D2D enabled node or UE may have a dynamic or semi-dynamic capability for Scenario 1 and/or 2, e.g. depending on the D2D enabled node or UE RF configuration, e.g., when the D2D enabled node or UE is capable of operating with at least two different D2D enabled node or UE RF configurations which can be configured dynamically or semi-dynamically.

A D2D enabled node or UE may be dynamically configured to support Scenarios 1 and/or 2 for (f1,f2) based on one or more criteria (a) and when meeting a certain condition, e.g., one or more may apply:

If the D2D enabled node or UE dynamic configuration supports a frequency distance df (df<=df_max) (df_max may or may not be different for Scenarios 1 & 2), the D2D enabled node or UE can also support Scenarios 1 and/or 2 for any f1=A and/or f2=B and f1=B and f2=A when abs(f1−f2)<=df_max.

If the D2D enabled node or UE dynamic configuration supports D2D operation at maximum frequency f1_max and/or cellular operation at maximum frequency f2_max, then the D2D enabled node or UE can also support Scenarios 1 and/or 2 for any (f1,f2) under the conditions f1<=f1_max and/or f2<=f2_max.

If the D2D enabled node or UE dynamic configuration supports D2D operation at a minimum frequency f1_min and/or cellular operation at a minimum frequency f2_min, then the D2D enabled node or UE can also support Scenarios 1 and/or 2 for any (f1,f2) under the conditions f1_min<=f1 and/or f2_min<=f2.

If the D2D enabled node or UE dynamic configuration supports frequency duplex distance d(f1,f2) in a range [d_min,d_max], then the D2D enabled node or UE can also support Scenarios 1 and/or 2 for any (f1,f2) under the condition d_min<=d(f1,f2)<=d_max, where d(f1,f2) is a duplex distance for f1 and f2, and where in one example 0=d_min<d_max, in another example 0<d_min<d_max=Inf, and in yet another example d_min=d_max. The duplex distance d(f1,f2) may be, e.g., abs(f1_UL-f2_DL) for Scenario 1 and abs(f1_DL-f2_UL) for Scenario 2.

If the D2D enabled node or UE dynamic configuration supports Rx-Tx separation S in a range [S_min, S_max], then the D2D enabled node or UE can also support Scenarios 1 and/or 2 for any (f1,f2) under the condition
S_min<=S(f1,f2)<=S_max, where S(f1,f2) is a Rx-Tx separation for f1 and f2, and where in one trivial example 0=S_min<S_max, in another trivial example 0<S_min<S_max=Inf, and in yet another trivial example S_min=S_max. The Rx-Tx separation S(f1,f2) may be, e.g., abs(f1_UL-f2_DL) for Scenario 1 and abs(f1_DL-f2_UL) for Scenario 2.

If the D2D enabled node or UE dynamic configuration supports bandwidth BW_min<=BW<=BW_max, then the D2D enabled node or UE can also support Scenarios 1 and/or 2 for (f1,f2) on the bandwidth within the range [BW_min,BW_max].

Capability data related to support of Scenario 1 and/or Scenario 2 is discussed in the following.

Based on the above description, the D2D enabled node or UE capability to support Scenarios 1 and/or 2 may comprise any one or more of:

Explicit list of supported carrier frequency combinations (f1,f2),

Explicit list of support band combinations (f1,f2),

Implicit list of frequency or band combinations (f1,f2), e.g.,

Any (f1,2) for which frequency distance is below df_max and/or duplex distance is within [d_min,d_max] and/or Rx-Tx separation is within [S_min,S_max], etc.

Criteria applicable to qualify a frequency or band combination (f1,f2) as a supported combination, Conditions that a supported frequency or band combination (f1,f2) shall meet.

In the following, capability data signaling is discussed.

In a further embodiment, the first D2D enabled node or UE may optionally maintain or obtain and/or be adapted to maintain or obtain its capability data related to its support of Scenarios 1 and/or 2 and signal it to a second D2D enabled node or UE or to a first network node (e.g., serving eNodeB, neighbor eNodeB, MME, positioning node, D2D server, coordinating node, RNC). There may be also separate capabilities for Scenario 1 and Scenario 2.

The signaling may be via broadcast, multicast, or unicast, via physical channel signaling or higher-layer signaling or a combination thereof.

The signaling may be upon a request (from a node or D2D enabled node or UE which may or may not be the node or the D2D enabled node or UE receiving the capability indicator) or in unsolicited way, e.g., triggered by an event or condition. For example, the capability may be signaled:

Prior, during or after cell change procedure e.g. handover procedure, PCell change etc, Prior, during or after RRC connection (re)establishment, Prior, during or after RRC connection release with redirection, Prior or during D2D session set up request or D2D resource request, Prior or during a D2D session, As a part of all D2D enabled node or UE radio capabilities transfer or as a part of D2D enabled node or UE D2D capabilities transfer, Periodically after certain time period e.g. after expiry of a timer.

The first network node or the second D2D enabled node or UE receiving the capability may signal it or relay to a second network node or to a third D2D enabled node or UE or use it for one or more purposes as described herein.

Recommended or Preferred Carrier Frequencies/Bands for D2D and Cellular Operation According to this variant, a first D2D enabled node or UE may indicate or recommend to a network node or another D2D enabled node or UE its preferred combination(s) (f1,f2) for operating in Scenario 1 and/or Scenario 2, based on its capability related to support of Scenarios 1 and/or 2.

Requirements Applicability for D2D Enabled Node or UEs with the Capability of Supporting Scenario 1 and/or Scenario 2

The D2D enabled node or UE with the capability for supporting Scenario 1 and/or Scenario 2 may be required to meet a first set of D2D requirements and/or a first set of cellular requirements in the respective scenario, wherein the first set of D2D requirements and/or the first set of cellular requirements may be different from the respective requirements for D2D enabled node or UEs without this capability which are operating D2D and cellular on f1 and f2 but not when simultaneously configured.

According to one embodiment, the D2D enabled node or UE is adapted to adapt, and/or adapts, its RF capability to support Scenario 1 and/or Scenario 2 for a frequency or band combination (f1,f2). The adaptation performed in order to support Scenario 1 and/or Scenario 2 may comprise, e.g.:

adapting of at least one parameter for a receiver of a D2D enabled node or UE and/or a transmitter of a D2D enabled node or UE transmitter or a transceiver of a D2D enabled node or UE, selecting a D2D enabled node or UE receiver and/or D2D enabled node or UE transmitter or D2D enabled node or UE transceiver configuration comprising one or more parameters, selecting a D2D enabled node or UE receiver and/or D2D enabled node or UE transmitter or D2D enabled node or UE transceiver type from a set of types.

A D2D device may generally comprise an adaption module for adapting and/or selecting a RF capability, in particular of a D2D enabled node or UE, as described herein.

Some examples of the parameters comprise sampling rate and jitter, dynamic range, thresholds associated with RF characteristics, filter type or filter configuration parameter, LNA configuration, center frequency of local oscillators, ADC bandwidth, RF bandwidth, integration time for measurements; any one or any combination of such parameters may be adapted and/or be basis for selecting.

The adaption may be performed to achieve support of a given target frequency or band combination (f1,f2) and/or to achieve a certain target performance (D2D performance and/or cellular performance) while operating in Scenario 1 and/or Scenario 2.

The adaptation may be in a semi-static or dynamic fashion. The adaptation may be performed by the D2D enabled node or UE, e.g., autonomously, upon a request from another node (e.g., a network node or another D2D enabled node or UE), or upon a triggering condition or triggering event (the triggering conditions or events can be pre-defined or configurable). The adaptation may also be controlled by a network node in a semi-static or dynamic fashion, as e.g. described herein.

In one example, the combination (f1,f2) may be explicitly given. In another example, the combination (f1,f2) may be given implicitly by a set of conditions and criteria. The conditions and criteria may be pre-defined or configurable.

For example, the adaptation may be performed, and/or the D2D enabled node or UE may be adapted to for an adaptation or selection, such that one or more of target parameters satisfy the condition imposed by the target combination (f1,f2) which the D2D enabled node or UE intends to support, e.g.:

For target supported frequency distance: $df\_max\_target >= abs(f1-f2)$,

For target supported maximum frequency: $f1\_max\_target >= f1$ and/or $f2\_max\_target >= f2$, For target supported minimum frequency: $f1\_min\_target >= f1$ and/or $f2\_min\_target >= f2$, For target supported duplex distance: $d\_min\_target <= d(f1,f2) <= d\_max\_target$, For target supported Rx-Tx separation $S\_min\_target <= S(f1,f2) <= S\_max\_target$.

For target supported maximum bandwidth: $BW\_max\_target >= max(f1\_BW, f2\_BW)$ For target supported minimum bandwidth: $BW\_min\_target >= min(f1\_BW, f2\_BW)$ Herein, the capability data related to support of Scenario 1 and/or Scenario 2 may be as described in the first D2D enabled node or UE methods above.

In one embodiment, a second D2D enabled node or UE may receive, and/or be adapted to receive, capability data or information or a corresponding indication or message regarding or for a first D2D enabled node or UE and/or related to support of Scenario 1 and/or Scenario 2 of the first D2D enabled node or UE, from the first D2D enabled node or UE, a third D2D enabled node or UE, or from a network node (e.g., e.g., serving or neighbor eNodeB, MME, D2D server, positioning node, coordinating node, RNC).

In another embodiment, the second D2D enabled node or UE may be adapted to request, and/or request, from the first D2D enabled node or UE to send its (i.e. the first's) capability data or information or a corresponding indication or message, in particular related to support of Scenario 1 and/or Scenario 2, to itself or to another D2D enabled node or UE or to a network node. Generally, the second D2D enabled node or UE may be adapted to request, and/or request, capability data or information or a corresponding indication and/or message regarding and/or for a first D2D enabled node or UE, e.g. form the network and/or a network node and/or a D2D enabled node or UE, in particular the first D2D enabled node or UE or a third one. The second D2D enabled node or UE may receive, and/or be adapted to receive the requested capability data or information or a corresponding indication or message, e.g. from the first D2D enabled node or UE, a third D2D enabled node or UE, or from a network node (e.g., e.g., serving or neighbor eNodeB, MME, D2D server, positioning node, coordinating node, RNC).

Generally, a second D2D device may comprise a requesting module for requesting data and/or information and/or indication and/or a message as described herein. Alternatively or additionally, it may comprise a receiving module for receiving a capability and/or corresponding data and/or information and/or indication and/or message as described herein, in particular for receiving requested capability and/or corresponding data and/or information and/or indication and/or message (if there is a requesting module).

The second D2D enabled node or UE may be adapted to use, and/or use, the received capability and/or corresponding data and/or information and/or indication and/or message for different purposes, e.g., for one or more of:

Storing in a buffer, internal or external memory, database, in history data,

Sending or forwarding the received capability to a network node or to a third D2D enabled node or UE, Adapting own D2D configuration (e.g. receiver type, carrier on which to perform D2D operation) for communicating with the first D2D enabled node or UE or receiving signals from the first D2D enabled node or UE, Sending own D2D-related capability, e.g., the capability data related to support of Scenario 1 and/or Scenario 2.

Recommending carrier frequenc(ies) and/or bands on which the second D2D enabled node or UE should be configured for D2D operation, wherein the recommendation is based on the first D2D enabled node or UE's capability information and the second D2D enabled node or UE's capability i.e. frequenc(ies) and/or bands commonly supported by the first and second D2D enabled node or UEs.

A second D2D device may comprise a D2D use module for using the received capability and/or corresponding data and/or information and/or indication and/or message as described herein.

Herein, the capability and/or corresponding data and/or information and/or indication and/or message related to support of Scenario 1 and/or Scenario 2 may be as described in the first D2D enabled node or UE methods above.

According to one variant, a first network node (e.g., serving or neighbor eNodeB, MME, D2D server, positioning node, coordinating node, RNC) may be adapted to receive, and/or receive, a first D2D enabled node or UE's capability and/or corresponding data and/or information and/or indication and/or message, in particular related to support of Scenario 1 and/or Scenario 2, from the first D2D enabled node or UE, a second D2D enabled node or UE, or from another network node.

In another embodiment, a second network node (which may be the same or different from the first network node) may be adapted to request such data and/or information and/or indication and/or message request from the first D2D enabled node or UE or another D2D enabled node or UE or like a second one or another network node. The second network node may be adapted to receive and/or receive such data and/or information and/or indication and/or message.

Optionally, the first and/or second network node may be adapted to receive and/or request and receive, respectively, capability and/or corresponding data and/or information and/or indication and/or message, in particular regarding Scenario 1 and/or 2, regarding a second D2D enabled node or UE, from any one of the nodes mentioned above, in particular from the second D2D enabled node or UE, or another D2D enabled node or UE or a network node. A network device may comprise corresponding receiving or receiving and requesting modules and/or utilize the modules mentioned above in the context of receiving and requesting regarding a first D2D enabled node or UE.

A network device may comprise a NW request module for requesting a capability and/or corresponding data and/or information and/or indication and/or message as described herein, and/or a NW receiving module for receiving such data and/or information and/or indication and/or message as described herein.

Any one of the first D2D enabled node and/or another D2D enabled node or UE or a network node may be adapted to transmit, and/or transmit, such data and/or information and/or indication and/or message in response to a request, which it may receive and/or be adapted to receive. A corresponding D2D device and/or network device may comprise a request responding module for receiving a request and/or transmitting in response as described herein.

The first network node may use, and/or be adapted to use, the received capability and/or corresponding data and/or information and/or indication and/or message for different purposes, e.g., one or more of:

Storing in a buffer, internal or external memory, database, in history data, for processing, using it at a future time etc.

Deciding a D2D configuration for the first D2D enabled node or UE or D2D configuration in a cell, Deciding a CA configuration or a multi-carrier configuration in general of the first D2D enabled node or UE, Configuring for and/or controlling the first D2D enabled node or UE operation in Scenario 1 and/or Scenario 2, e.g. (re)configuring the first D2D enabled node or UE with carriers and/or bands according to the capability indicated by the first D2D enabled node or UE.

Resource allocation to the first D2D enabled node or UE at handover, e.g., when the operation in Scenario 1 and/or Scenario 2 occurs prior, during or after handover, Accounting for the first D2D enabled node or UE capability for RRM purpose (e.g., load balancing, interference coordination, measurement collection for MDT or SON), Accounting for the first D2D enabled node or UE capability when configuring cellular measurements for different purposes (e.g., to ensure that certain radio measurements can be performed while the first D2D enabled node or UE is performing a D2D operation), Sending or forwarding the received capability to a third network node or to a second D2D enabled node or UE, Collecting statistics comprising D2D enabled node or UE capabilities, Adapting one or more radio parameters used at the network node. For example increasing the bandwidth of carrier frequencies used for serving cellular data etc.

A network device may comprise a corresponding NW use module for using the capability and/or corresponding data and/or information and/or indication and/or message as described herein.

The network node, in addition to first D2D enabled node or UE's capability, may be adapted to take into account, and/or take into account, at least the second D2D enabled node or UE's capability information related to carriers and/or band combinations when using the capability and/or corresponding data and/or information and/or indication and/or message, in particular when configuring the first D2D enabled node or UE with the carrier for at least D2D operation. For example, the network node may configure the first D2D enabled node or UE with the carrier for D2D operation that is also supported by the second D2D enabled node or UE for D2D operation i.e. on common frequency and/or band. In this way the first D2D enabled node or UE can perform D2D operation with the second D2D enabled node or UE.

According to a variant, the network node may be adapted to control or configure, and/or control or configure, the D2D enabled node or UE adaptation of its radio configuration for supporting Scenario 1 and/or Scenario 2. The configuring or controlling may comprise, e.g., any one or more of:

Sending to a D2D enabled node or UE an explicit or implicit request or an indication for the need to adapt its radio configuration to support Scenarios 1 and/or 2, Sending at least one parameter controlling the D2D enabled node or UE adaptation of its radio configuration to support Scenarios 1 and/or 2, Sending a performance indication or a performance target to achieve by the adaptation, which may comprise e.g. a performance metric and/or target performance level, Configuring a radio configuration in the D2D enabled node or UE and hereby adapting its radio configuration, Receiving a radio configuration or at least one radio configuration parameter adapted by the D2D enabled node or UE.

The configuring or controlling may further comprise using some information from itself, received from another network node or received from the D2D enabled node or UE for adapting the D2D enabled node or UE in Scenarios 1 and/or 2 or assisting the D2D enabled node or UE in the adaptation, e.g., any one or more of:

Receiving a feedback from the D2D enabled node or UE related to the performance with the adapted configuration or configuration recommended by the network node, Receiving D2D enabled node or UE measurements with and/or without (i.e., before/after) the adaptation, Receiving UL measurements from another network node, Receiving D2D enabled node or UE (static and/or current demi-static/dynamic) capability from another network node, Receiving D2D enabled node or UE (static and/or current semi-static/dynamic) capability from the D2D enabled node or UE.

A network device may comprise a corresponding NW controlling module for configuring or controlling as described herein.

The described approaches provide:

A possibility for some D2D enabled node or UEs to support selected scenarios for D2D operation, comprising scenarios with simultaneous D2D and cellular operation in different frequencies or bands.

A possibility of other nodes to be aware of and use a D2D enabled node or UE capability related to its support of Scenario 1 and/or Scenario 2.

Dynamic adaptation of the support for carrier frequencies and/or bands at the D2D enabled node or UE for performing D2D and cellular operations depending on the need and scenario.

More efficient utilization of D2D enabled node or UE's carrier frequencies and/or bands capability D2D and cellular operations.

There is also disclosed a D2D enabled node, which may be adapted to perform any one or any one combination of the methods and/or comprise any one or any one combination of the features described herein in the context of a D2D enabled node. In particular, control circuitry and/or a controller of the D2D enabled node may be adapted to control and/or perform the method and/or steps of the method. The D2D enable node may be a node of and/or for a wireless communication network. Alternatively or additionally, a D2D enabled node may be adapted to control its D2D transmit power based on a TPC transmission, in particular based on a TPC transmission from a network node. A corresponding method is also envisioned.

There is also disclosed a network node, which may be adapted to perform any one or any one combination of the methods and/or comprise any one or any one combination of the features described herein in the context of a network node. In particular, control circuitry and/or a controller of the network node may be adapted to control and/or perform the method and/or steps of the method. The network node may be a node of and/or for a wireless communication network.

There is also disclosed a method, in particular in and/or for D2D operation of a network, which may combine any of the steps of the methods for operating a D2D enabled node and a network node described herein.

There are also disclosed one or more software devices, e.g. a D2D device and/or a network device comprising suitable modules adapted to perform the steps of any of the methods described herein.

Generally, there is also disclosed a computer program product comprising instructions executable by control circuitry and/or a computing device, the instruction causing the control circuitry and/or computing device to carry out and/or control any one of the methods described herein when executed by the control circuitry and/or computing device. The control circuitry and/or computing device may be implemented in any one or more than one of the nodes to carry out and/or control corresponding methods or method steps.

Modules performing method steps described herein may generally be implemented in software and/or hardware and/or firmware in and/or on corresponding nodes. Modules of or on or in one node or device, in particular modules for a D2D device or network device, may be implemented in a common module or flow and/or in parallel and/or independent modules or flows and/or share functionality.

A D2D enabled node may generally be a node adapted to perform D2D communication, in particular transmission and/or reception, and/or at least one type of D2D operations. In particular, a D2D enabled node may be a terminal and/or user equipment. The D2D enabled node may be adapted to transmit and/or receive D2D data based on allocation data, in particular on and/or utilizing resources indicate in the allocation data. D2D communication and/or transmission by a D2D enabled node may in some variants be in UL resources and/or at least one corresponding carrier or frequency and/or modulation.

In the context of this description, wireless communication may be communication, in particular transmission and/or reception of data, via electromagnetic waves and/or an air interface, in particular radio waves, e.g. in a wireless communication network and/or utilizing a radio access technology (RAT). The communication may be between nodes of a wireless communication network and/or in a wireless communication network. It may be envisioned that a node in or for communication, and/or in, of or for a wireless communication network is adapted for, and/or for communication utilizing, one or more RATs, in particular LTE/E-UTRA. A communication may generally involve transmitting and/or receiving messages, in particular in the form of packet data. A message or packet may comprise control and/or configuration data and/or payload data and/or represent and/or comprise a batch of physical layer transmissions. Control and/or configuration data may refer to data pertaining to the process of communication and/or nodes of the communication. It may, e.g., include address data referring to a node of the communication and/or data pertaining to the transmission mode and/or spectral configuration and/or frequency and/or coding and/or timing and/or bandwidth as data pertaining to the process of communication or transmission, e.g. in a header.

Each node involved in communication may comprise radio circuitry and/or control circuitry and/or antenna circuitry, which may be arranged to utilize and/or implement one or more than one radio access technologies.

Radio circuitry of a node may generally be adapted for the transmission and/or reception of radio waves, and in particular may comprise a corresponding transmitter and/or receiver and/or transceiver, which may be connected or connectable to antenna circuitry and/or control circuitry. Control circuitry of a node may comprise a controller and/or memory arranged to be accessible for the controller for read and/or write access. The controller may be arranged to control the communication and/or the radio circuitry and/or provide additional services. Circuitry of a node, in particular control circuitry, e.g. a controller, may be programmed to provide the functionality described herein. A corresponding program code may be stored in an associated memory and/or storage medium and/or be hardwired and/or provided as firmware and/or software and/or in hardware. A controller may generally comprise a processor and/or microprocessor and/or microcontroller and/or FPGA (Field-Programmable Gate Array) device and/or ASIC (Application Specific Integrated Circuit) device. More specifically, it may be considered that control circuitry comprises and/or may be connected or connectable to memory, which may be adapted to be accessible for reading and/or writing by the controller and/or control circuitry.

Radio access technology may generally comprise, e.g., Bluetooth and/or Wifi and/or WIMAX and/or cdma2000 and/or GERAN and/or UTRAN and/or in particular E-Utran and/or LTE. A communication may in particular comprise a physical layer (PHY) transmission and/or reception, onto which logical channels and/or logical transmission and/or receptions may be imprinted or layered.

A node of a wireless communication network may be implemented as a user equipment and/or base station and/or relay node and/or any device generally adapted for device-to-device communication. A wireless communication network may comprise at least one of a device configured for device-to-device communication and/or a user equipment and/or base station and/or relay node, in particular at least one user equipment, which may be arranged for device-to-device communication with a second node of the wireless communication network, in particular with a second user equipment. A node of or for a wireless communication network may generally be a wireless device configured for wireless device-to-device communication, in particular using the frequency spectrum of a cellular and/or wireless communications network, and/or frequency and/or time resources of such a network. Device-to-device communication may optionally include broadcast and/or multicast communication to a plurality of devices or nodes.

A cellular network may comprise a network node, in particular a radio network node, which may be connected or connectable to a core network, e.g. a core network with an evolved network core, e.g. according to LTE. The connection between the network node and the core network/network core may be at least partly based on a cable/landline connection. Operation and/or communication and/or exchange of signals involving part of the core network, in particular layers above a base station or eNB, and/or via a predefined cell structure provided by a base station or eNB, may be considered to be of cellular nature or be called cellular operation. Operation and/or communication and/or exchange of signals without involvement of layers above a base station and/or without utilizing a predefined cell structure provided by a base station or eNB, may be considered to be D2D communication or operation, in particular, if it utilises the radio resources, in particular carriers and/or frequencies, and/or equipment (e.g. circuitry like radio circuitry and/or antenna circuitry, in particular transmitter and/or receiver and/or transceiver) provided and/or used for cellular operation.

A user equipment (UE) may generally be a device configured for wireless device-to-device communication and/or a terminal for a wireless and/or cellular network, in particular a mobile terminal, for example a mobile phone, smart phone, tablet, PDA, etc. A user equipment may be a node of or for a wireless communication network as described herein, in particular a D2D enabled node. It may be envisioned that a user equipment is adapted for one or more RATs, in particular LTE/E-UTRA. A user equipment may generally be proximity services (ProSe) enabled, which may mean it is D2D capable or enabled. It may be considered that a user equipment comprises radio circuitry and/control circuitry for wireless communication. Radio circuitry may comprise for example a receiver device and/or transmitter device and/or transceiver device. Control circuitry may include a controller, which may comprise a microprocessor and/or microcontroller and/or FPGA (Field-Programmable Gate Array) device and/or ASIC (Application Specific Integrated Circuit) device. It may be considered that control circuitry comprises or may be connected or connectable to memory, which may be adapted to be accessible for reading and/or writing by the controller and/or control circuitry. A node or device of or for a wireless communication network, in particular a node or device for device-to-device communication, may generally be a user equipment. It may be considered that a user equipment is configured to be a user equipment adapted for LTE/E-UTRAN.

A base station may be any kind of base station of a wireless and/or cellular network adapted to serve one or more user equipments. It may be considered that a base station is a node of a wireless communication network. A base station may be adapted to provide and/or define one or more cells of the network and/or to allocate frequency and/or time resources for communication to one or more nodes of a network, in particular UL resources, for example for device-to-device communication, which may be communication between devices different from the base station. Generally, any node adapted to provide such functionality may be considered a base station.

It may be considered that a base station or more generally a network node, in particular a radio network node, comprises radio circuitry and/or control circuitry for wireless communication. It may be envisioned that a base station or network node is adapted for one or more RATs, in particular LTE/E-UTRA. Radio circuitry may comprise for example a receiver device and/or transmitter device and/or transceiver device. Control circuitry may include a controller, which may comprise a microprocessor and/or microcontroller and/or FPGA (Field-Programmable Gate Array) device and/or ASIC (Application Specific Integrated Circuit) device.

It may be considered that control circuitry comprises or may be connected or connectable to memory, which may be adapted to be accessible for reading and/or writing by the controller and/or control circuitry. A base station may be arranged to be a node of a wireless communication network, in particular configured for and/or to enable and/or to facilitate and/or to participate in device-to-device communication, e.g. as a device directly involved or as an auxiliary and/or coordinating node.

Generally, a base station may be arranged to communicate with a core network and/or to provide services and/or control to one or more user equipments and/or to relay and/or transport communications and/or data between one or more user equipments and a core network and/or another base station and/or be Proximity Service enabled. An eNodeB (eNB) may be envisioned as an example of a base station. A base station may generally be proximity service enabled and/or to provide corresponding services. It may be considered that a base station is configured as or connected or connectable to an Evolved Packet Core (EPC) and/or to provide and/or connect to corresponding functionality. The functionality and/or multiple different functions of a base station may be distributed over one or more different devices and/or physical locations and/or nodes. A base station may be considered to be a node of a wireless communication network. Generally, a base station may be considered to be configured to be a coordinating node and/or to allocate resources in particular for device-to-device communication between two nodes of a wireless communication network, in particular two user equipments.

Device-to-device (D2D) communication or operation may generally refer to communication between nodes of a wireless communication network or corresponding operation of one or more nodes, which may utilize the frequency spectrum and/or frequency and/or time resources of the network, in particular according to LTE/E-UTRAN. The communication may be wireless communication. A device in this context may be a node of the wireless communication network, in particular a user equipment or a base station. Device-to-device communication may in particular be communication involving at least one user equipment, e.g. between two or more user equipments. Device-to-device communication may be relayed and/or provided via a base station or coordinating node or relay node, in particular without interaction with a core network and/or layers of the network above a base station or coordinating node, or be direct communication between two devices, e.g. user equipments, without involvement of a base station or coordinating node and/or with a base station or coordinating node providing merely auxiliary services, e.g. configuration data or a transmission configuration or related information for a message intended for device-to-device communication between user equipments. In the latter case, it may be considered that data and/or signals flowing between the nodes performing device-to-device communication are not transported via the base station and/or coordinating node. In contrast, during cellular communication, network layers above the eNB/base station/coordination node may generally be involved, in particular core layers which may be connected to the eNB/base station/coordinating node via cable/land line. During device-to-device communication, a message may be provided and/or transmitted and/or received. A message may be considered to be or be represented by a batch of physical layer transmissions and/or may comprise such. A message may comprise information regarding the transmission configuration, in particular regarding related information, e.g. in a header, and/or a payload. A unidirectional message may be a message for connectionless communication and/or for which no prior communication and/or prior connection between the transmitting node and receiving node is necessary and/or available and/or for which no response or no response protocol or no handshake is expected.

A device configured for and/or capable of device-to-device communication, which may be called D2D enabled device or node, may comprise control circuitry and/or radio circuitry configured to provide device-to-device communication, in particular configured to enable proximity services (ProSe-enabled), e.g., according to LTE/E-UTRA requirements. D2D operation or communication and cellular operation or communication may be considered different operation types or modes, which may generally performed using resources from the same pool of available resources, e.g. allocated resources and/or the same carriers.

In some examples, the terms 'D2D' or 'proximity service' (ProSe) or 'peer-to-peer communication' may be used interchangeably.

A D2D enabled node may be a UE, which may be D2D capable, and may be referred to as D2D enabled or capable UE. It may comprise any entity or device or node capable of at least receiving or transmitting radio signals on a direct radio link, i.e., between this entity and another D2D capable entity. A D2D-capable device or D2D enabled node may for example be comprised in or comprise a cellular UE, PDA, a wireless device, laptop, mobile, sensor, relay, D2D relay, a small base station employing a UE-like interface, etc. A D2D enabled node or UE is able to support at least one D2D operation. A D2D enabled node may generally be adapted for cellular operation and/or communication in a wireless communication network. A D2D enabled node may generally comprise radio circuitry and/or control circuitry for wireless communication, in particular D2D operation or communication and cellular operation or communication. A D2D device may be a software/program arrangement arranged to be executable by a hardware device, e.g. control circuitry, and/or storable in a memory of e.g. a UE or terminal, which may provide D2D functionality and/or corresponding control functionality to e.g. a UE or terminal.

D2D operation may comprise any action or activity related to D2D or D2D communication and may be used interchangeably D2D communication. D2D operation may include, e.g., transmitting or receiving a signal/channel type or data for D2D purposes and/or in D2D operation, transmitting or receiving data by means of D2D communication, transmitting or receiving control or assistance data for D2D purpose, transmitting or receiving a request for control or assistance data for D2D, selecting a D2D operation mode, initiating/starting D2D operation, switching to D2D operation mode from a cellular operation mode, configuring receiver or transmitter with one or more parameters for D2D. D2D operation may be for a commercial purpose or to support public safety, using the data related to D2D. D2D operation may or may not be specific to a certain D2D service. A D2D receive operation may be, and/or be comprised in, a D2D operation, which may, in one example, also involve other than D2D receive operations. A D2D operation may generally be performed or performable by a D2D enabled node or UE. A D2D receive operation may comprise receiving, by a D2D enabled node, of D2D data and/or signals. A D2D transmit operation may comprise, transmitting, by a D2D enabled node, of D2D data and/or signals. A D2D enabled node performing at least one D2D operation may be considered to be in D2D or D2D mode or in D2D operation.

Cellular operation (in particular by a D2D enabled node or UE) may comprise any action or activity related to a cellular network (any one or more RATs). Some examples of cellular operation may be a radio signal transmission, a radio signal reception, performing a radio measurement, performing a mobility operation or RRM related to a cellular network.

D2D transmission may be any transmission by a D2D enabled node or device and/or in a D2D operation or mode or communication. Some examples of D2D transmission may comprise physical signals or physical channels, dedicated or common/shared, e.g., reference signal, synchronization signal, discovery channel, control channel, data channel, broadcast channel, paging channel, scheduling assignment (SA) transmissions, etc. A D2D transmission on a direct radio link may be intended for receiving by another D2D device. A D2D transmission may be a unicast, groupcast, or broadcast transmission. A D2D transmission may be on the uplink time-frequency resources of a wireless communication system.

A coordinating or controlling or allocating node may be a node or network node that is adapted to schedule, decide and/or select and/or allocate, at least in part, time-frequency resources to be used for at least one of: cellular transmissions and D2D transmissions. The coordinating node may also provide the scheduling information to another node such as another D2D enabled node, a cluster head, a radio network node such as eNodeB, or a network node (e.g. a core network node), MME, positioning node, D2D server, RNC, SON, etc). The network node or coordinating node may communicate with a radio network node. It may be envisioned that a coordinating node may also perform coordination for one or more D2D enabled node or UEs. The coordination may be performed in a centralized or distributed manner. A coordinating node may provide the functionality of an allocation node. A network device may be a software/program arrangement arranged to be executable by a hardware device, e.g. control circuitry, and/or storable in a memory of a network node, which may provide D2D functionality and/or corresponding control functionality to e.g. network node.

Radio spectrum: Although at least some of the embodiments are described for D2D transmissions in the UL spectrum (FDD) or UL resources (TDD), the embodiments are not limited to the usage of UL radio resources, neither to licensed or unlicensed spectrum, or any specific spectrum at all.

A cellular network or wireless communication network may comprise e.g. an LTE network (FDD or TDD), UTRA network, CDMA network, WiMAX, GSM network, any network employing any one or more radio access technologies (RATs) for cellular operation. The description herein is given for LTE, but it is not limited to the LTE RAT.

RAT (radio access technology) may generally include: e.g. LTE FDD, LTE TDD, GSM, CDMA, WCDMA, WiFi, WLAN, WiMAX, etc.

A network node may be a radio network node (which may be adapted for wireless or radio communication, e.g. with a D2D enabled node or a UE) or another network node. A network node generally may be an allocation node or coordinating node. Some examples of the radio network node are a radio base station, eNodeB, a relay node, an access point, a cluster head, RNC, etc. The radio network node may be comprised in a wireless communication network and may also support cellular operation. A network node, in particular a radio network node, comprises radio circuitry and/or control circuitry, in particular for wireless communication. Some examples of a network node, which is not a radio network node, may comprise: a core network node, MME, a node controlling at least in part mobility of a wireless device, SON node, O&M node, positioning node, a server, an application server, a D2D server (which may be capable of some but not all D2D-related features), a node comprising a ProSe function, a ProSe server, an external node, or a node comprised in another network. Any network node may comprise control circuitry and/or a memory. A network node may be considered to be serving a D2D enabled node or UE, if it provides a cell of a cellular network to the served node or D2D enabled node or UE and/or is connected or connectable to the D2D enabled node or UE via and/or for transmission and/or reception and/or UL and/or DL data exchange or transmission and/or if the network node is adapted to provide the D2D enabled node or UE with allocation and/or configuration data and/or to configure the D2D enabled node or UE.

Multiple carrier frequencies or functionality may refer to any of: different carrier frequencies within the same frequency band or within different frequency bands, same PLMN or different PLMNs, same RAT or different RATs. D2D operation may or may not occur on dedicated carrier frequencies. DL and UL carrier frequencies in FDD are also examples of different carrier frequencies. A frequency band herein may be FDD, TDD, HD-FDD, or unidirectional (e.g., DL-only band such as Band 29, in some examples). Multiple carrier functionality may include carrier aggregation functionality.

The term 'TPC for D2D' used herein may refer to or comprise at least one power control command for one or more of D2D transmissions (e.g., SA, D2D data, D2D synchronization signal, D2D control channel, D2D discovery transmission, any D2D transmission for D2D communication, any D2D transmission for D2D discovery). 'TPC for cellular UL' may comprise or refer to at least one power control command sent by or via a network node or eNodeB to control tx power of one or more cellular UL transmissions. The two different types of TPCs may be sent in the same or separate messages to the D2D enabled node or UE, via the same or different channels or channel types (e.g., PDCCH and/or EPDCCH) and/or be comprises in one set or packet or message of allocation data or in different sets or packets or messages of allocation data.

A D2D enabled node may generally be a node adapted to perform D2D communication, in particular transmission and/or reception, and/or at least one type of D2D operations. In particular, a D2D enabled node may be a terminal and/or user equipment and/or D2D enabled machine and/or sensor. The D2D enabled node may be adapted to transmit and/or receive D2D data based on allocation data, in particular on and/or utilizing resources indicate in the allocation data. D2D communication and/or transmission by a D2D enabled node may generally be in UL resources and/or corresponding carrier or frequency and/or modulation. In this context, stopping D2D communication in response and/or based on a release message may be considered to correspond to transmitting based on allocation data, wherein the release message may be considered to be allocation data. A D2D enabled node (such as a UE) may be adapted for and/or capable of CA or CA operation. In particular, it may be adapted to transmit and/or receive one or more than one CCs and/or utilising, and/or participating in, carrier aggregation.

A D2D enabled node may be adapted to configure itself according to configuration data, which may include setting up and/or scheduling resources and/or equipment for receiving and/or transmitting and/or sharing of resources and/or in particular D2D operation and/or cellular operation based on the configuration data. Configuration data may be received, by the D2D enabled node, from another node, in particular a network node. A network node, in particular a controlling and/or allocating node, generally may be adapted to provide and/or determine and/or transmit configuration data, in particular to a D2D enabled node. Configuration data may be considered to be a form of allocation data and/or may be provided in the form of a message and/or data packet/s.

Configuring a D2D enabled node or UE, e.g. configuring of the node by a network node, may include determining and/or transmitting configuration data to the node to be configured, i.e. the D2D enabled node or UE.

Determining the configuration data and transmitting this data to a D2D enabled node or UE may be performed by different nodes, which may be arranged such that they may communicate and/or transport the configuration data between each other, in particular such that the node determining or adapted to determine the configuration data may transmit the configuration data to the node transmitting it or adapted to transmit it; the latter node may be adapted to receive the configuration data and/or relay and/or provide a message bases on the configuration data, e.g. by reformatting and/or amending and/or updating data received.

Transmit power (or power density) may generally refer to the power (or power density) of a signal transmitted or generally to the power of wireless transmission. Transmit power (or power density) may in particular refer to the power (or power density) of a signal transmitted by and/or transmissions of a D2D enabled node or UE. Transmit power generally may refer to a specific channel and/or frequency and/or cell and/or carrier and/or bandwidth and/or carrier aggregate and/or a general setup. UL transmit power, or shorter UL power, may refer to the power of a signal transmitted, in particular by a D2D enabled node or UE, in cellular operation and/or to or for a network node serving the D2D enabled node or UE, for example a base station or eNodeB. D2D transmit power (or power density) may refer to the power (or power density) of a signal transmitted, in particular by a D2D enabled node or UE, in D2D operation and/or for D2D transmission. Transmit power (or power density) may refer to or pertain to a time unit or interval, e.g. a slot, subframe or frame, and/or transmit power control may be performed for and/or updated in such units or intervals. Power control or transmit power control may generally refer to control of transmit power and/or transmit power spectral and/or temporal density. Power control commands in TPC format or TPC may be used for controlling power and/or to cause a D2D enabled node or UE receiving at least one such command or TPC message to control power based on and/or according to the command or TPC. The command or TPC may be transmitted to the D2D enabled node from or via a network node, in particular a base station or eNB or allocating node.

Capability data and/or a capability indication or indication message may provide and/or comprise capability information. In this context, the capability may refer to whether the D2D enabled node or UE is capable of operating simultaneously perform D2D and cellular operations on a combination of carriers and/or frequency bands and/or to which combination/s of carriers and/or frequency bands a D2D enabled node or UE can be configured, and/or is operable in and/or adapted to operate in, to simultaneously perform D2D and cellular operations; or at least a part of the corresponding combinations.

Capability/-ies information and/or the indication or indication message, may indicate explicitly or implicitly one, or at least one, or a plurality of, combination/s of carriers and/or frequency bands on which the first D2D enabled node or UE can be configured and/or is operable in and/or adapted to operate in, to simultaneously perform D2D and cellular operations, and/or may comprise parameters and/or parameter values and/or indication and/or information regarding the capabilities of the first D2D enabled node. The capability indication or indication message may be transmitted or transmittable as a D2D transmission or a cellular transmission. It may be envisioned that a D2D enabled node or UE determines and/or transmits and/or is adapted to determine and/or transmit such a message either and/or both as a D2D transmission and as a cellular transmission. In particular, a D2D enabled node or UE may be transmit or be adapted to transmit the indication or indication message as D2D transmission, in particular based on the target of the transmission being, and/or if the target of the transmission is, a second D2D enabled node or UE, and/or based on corresponding D2D resources being, and/or if corresponding D2D resources are, allocated to the D2D enabled node or UE. Alternatively or additionally, the D2D enabled node or UE may transmit, and/or be adapted to transmit, the indication or indication message in or with a cellular transmission or operation, in particular if the target node is not a D2D enabled node and/or based on cellular or only cellular resources being allocated to the D2D enabled node or UE. A D2D enabled node may be adapted to obtain capabilities information, e.g. by reading it from a memory or storage, which may be a memory or storage of the D2D enabled node or UE.

A D2D device may comprise an obtaining module for obtaining capabilities information, e.g. as described herein. Additionally or alternatively, a D2D device may comprise a capabilities information transmitting device for transmitting a capabilities indication or indication message as described herein.

Cellular DL operation of a D2D enabled node or UE may refer to receiving transmissions in DL, in particular in cellular operation and/or from a network node/eNB/base station. Cellular UL operation of a D2D enabled node or UE may refer to UL transmissions, in particular in cellular operation, e.g. transmitting to a network node/eNB/base station.

A storage medium may be adapted to store data and/or store instructions executable by control circuitry and/or a computing device, the instruction causing the control circuitry and/or computing device to carry out and/or control any one of the methods described herein when executed by the control circuitry and/or computing device. A storage medium may generally be computer-readable, e.g. an optical disc and/or magnetic memory and/or a volatile or non-volatile memory and/or flash memory and/or RAM and/or ROM and/or EPROM and/or EEPROM and/or buffer memory and/or cache memory and/or a database.

Allocated resources may generally be frequency and/or time resources. Allocated resources may comprise frequency-related information, in particular regarding one or more carriers and/or bandwidth and/or subcarriers and/or time-related information, in particular regarding frames and/or slots and/or subframes, and/or regarding resource blocks and/or time/frequency hopping information. Allocated resources may in particular refer to UL resources, e.g. UL resources for a first D2D enabled node to transmit to and/or for a second D2D enabled node. Transmitting on allocated resources and/or utilizing allocated resources may comprise transmitting data on the resources allocated, e.g. on the frequency and/or subcarrier and/or carrier and/or timeslots or subframes indicated. It may generally be considered that allocated resources may be released and/or de-allocated. A network or a node of a network, e.g. an allocation node, may be adapted to determine and/or transmit corresponding allocation data indicating release or de-allocation of resources to one or more D2D enabled nodes, in particular to a first D2D enabled node. Accordingly, D2D resource allocation may be performed by the network and/or by a node, in particular a node within and/or within a cell of a cellular network covering the D2D enabled nodes participating or intending to participate in the D2D communication.

Allocation data may be considered to be data indicating and/or granting resources allocated by the allocation node, in particular data identifying or indicating which resources are reserved or allocated for D2D communication for a D2D enabled node and/or which resources a D2D enabled node may use for D2D communication and/or data indicating a resource grant or release. A grant or resource grant may be considered to be one example of allocation data. It may be considered that an allocation node is adapted to transmit allocation data directly to a node and/or indirectly, e.g. via a relay node and/or another node or base station. Allocation data may comprise control data and/or be part of or form a message, in particular according to a pre-defined format, for example a DCI format, which may be defined in a standard, e.g. LTE. In particular, allocation data may comprise information and/or instructions to reserve resources or to release resources, which may already be allocated. Generally, allocation data may indicate and/or instruct transmission mode and/or configuration, in particular regarding a power level of transmission, e.g. for the first D2D enabled node. The first D2D enabled node may generally be adapted to perform transmission configuration according to allocation data, in particular to set a corresponding power level. It may be considered that allocation data comprises and/or is implemented as TPC and/or in TPC format.

A D2D transmission may be considered to be of a different type than a cellular and/or UL transmission. A transmission may pertain to a specific frequency and/or spectrum and/or bandwidth and/or carrier.

A receiver or receiver chain may generally be provided by a transceiver arrangement, which may have transmitting capabilities included, or as a separate arrangement, which may be implemented without having transmitting capacities included.

A measurement gap may refer to a time gap or interval, in which no transmission and reception happens, in particular regarding a serving cell or a given carrier. Since there is no signal transmission and reception during the gap (at least in the serving cell or given carrier), a D2D enabled node or UE can switch to another or a target cell or carrier and/or perform a measurement on the target cell or carrier, e.g. for signal quality, utilizing the same receiver.

The term "intra-frequency" may refer to issued related to the same frequency/bandwidth and/or carrier, e.g. between neighboring cells (which may be provided by different BSs) having the same frequencies available. The term "inter-frequency" may refer to issues related to different frequencies/bandwidths and/or carriers, e.g. between different carriers in a multi-carrier arrangement.

A receiving operation may comprise a measurement operation, e.g. a signal quality measurement, which may be performed in a measurement gap, in which a receiver switching to a carrier/frequency to be measured may be performed.

SOME ABBREVIATIONS USED ARE

3GPP 3rd Generation Partnership Project
Ack/Nack Acknowledgment/Non-Acknowledgement, also A/N
AP Access point
BER/BLER Bit Error Rate, BLock Error Rate;
BS Base Station
CA Carrier Aggregation
CoMP Coordinated Multiple Point Transmission and Reception
CQI Channel Quality Information
CRS Cell-specific Reference Signal
CSI Channel State Information
CSI-RS CSI reference signal
D2D Device-to-device
DL Downlink
EPDCCH Enhanced Physical DL Control CHannel
DL Downlink; generally referring to transmission of data to a node/into a direction further away from network core (physically and/or logically); in particular from a base station or eNodeB to a D2D enabled node or UE; often uses specified spectrum/bandwidth different from UL (e.g. LTE)
eNB evolved NodeB; a form of base station, also called eNodeB
E-UTRA/N Evolved UMTS Terrestrial Radio Access/Network, an example of a RAT
f1, f2, f3, . . . , fn carriers/carrier frequencies; different numbers may indicate that the referenced carriers/frequencies are different
f1_UL, . . . , fn_UL Carrier for Uplink/in Uplink frequency or band
f1_DL, . . . , fn_DL Carrier for Downlink/in Downlink frequency or band
FDD Frequency Division Duplexing
ID Identity
L1 Layer 1
L2 Layer 2
LTE Long Term Evolution, a telecommunications standard
MAC Medium Access Control
MBSFN Multiple Broadcast Single Frequency Network
MDT Minimisation of Drive Test
NW Network
OFDM Orthogonal Frequency Division Multiplexing
O&M Operational and Maintenance
OSS Operational Support Systems
PC Power Control
PDCCH Physical DL Control CHannel
PH Power Headroom
PHR Power Headroom Report
PSS Primary Synchronization Signal
PUSCH Physical Uplink Shared CHannel
RA Random Access
RACH Random Access CHannel
RAT Radio Access Technology
RE Resource Element
RB Resource Block
RRH Remote radio head
RRM Radio Resource Management
RRU Remote radio unit
RSRQ Reference signal received quality
RSRP Reference signal received power
RSSI Received signal strength indicator
RX reception/receiver, reception-related
SA Scheduling Assignment
SINR/SNR Signal-to-Noise-and-Interference Ratio; Signal-to-Noise Ratio
SFN Single Frequency Network
SON Self Organizing Network
SSS Secondary Synchronization Signal
TPC Transmit Power Control
TX transmission/transmitter, transmission-related
TDD Time Division Duplexing
UE User Equipment
UL Uplink; generally referring to transmission of data to a node/into a direction closer to a network core (physically and/or logically); in particular from a D2D enabled node or UE to a base station or eNodeB; in the context of D2D, it may refer to the spectrum/bandwidth utilized for transmitting in D2D, which may be the same used for UL communication to a eNB in cellular communication; in some D2D variants, transmission by all devices involved in D2D communication may in some variants generally be in UL spectrum/bandwidth/carrier/frequency These and other abbreviations may be used according to LTE standard definitions.

In this description, for purposes of explanation and not limitation, specific details are set forth (such as particular network functions, processes and signalling steps) in order to provide a thorough understanding of the technique presented herein. It will be apparent to one skilled in the art that the present concepts and aspects may be practiced in other embodiments and variants that depart from these specific details.

For example, the concepts and variants are partially described in the context of Long Term Evolution (LTE) or LTE-Advanced (LTE-A) mobile or wireless communications technologies; however, this does not rule out the use of the present concepts and aspects in connection with additional or alternative mobile communication technologies such as the Global System for Mobile Communications (GSM). While the following embodiments will partially be described with respect to certain Technical Specifications (TSs) of the Third Generation Partnership Project (3GPP), it will be appreciated that the present concepts and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the embodiments described herein are elucidated in the context of methods and devices, the concepts and aspects presented herein may also be embodied in a program product as well as in a system comprising control circuitry, e.g. a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. Because the aspects presented herein can be varied in many ways, it will be recognized that any scope of protection should be defined by the scope of the claims that follow without being limited by the description.

What is claimed is:

1. A first Device-to-Device (D2D) enabled node operable in a wireless communication network, the first D2D enabled node comprising:
    a radio circuit; and
    a processing circuit operatively coupled to the radio circuit and configured to:
        transmit capability information to a second D2D enabled node, wherein the capability information is indicative of a combination of different carriers and/or frequency bands to perform simultaneous D2D and cellular operations, wherein to perform the simultaneous D2D and cellular operations, the processing circuit is configured to use: a first carrier or a first frequency band, from the combination of different carriers and/or frequency bands, for a D2D operation with the second D2D enabled node, and a second carrier or a second frequency band, from the combination of different carriers and/or frequency bands, for a cellular downlink operation; and
        perform a cellular uplink operation on a third carrier or a third frequency band.

2. The first D2D enabled node according to claim 1, wherein the processing circuit is further configured to transmit the capability information from the first D2D enabled node to a network node.

3. A first Device-to-Device (D2D) enabled node operable in a wireless communication network, the first D2D enabled node comprising:
    a memory; and
    a control circuit in communication with the memory, wherein the control circuit is configured to execute one or more instructions stored in the memory to:
        obtain, from a second D2D enabled node, capability information indicating at least one combination of different carriers and/or frequency bands on which the second D2D enabled node is configured to simultaneously perform D2D and cellular operations;
        perform, using a first carrier or a first frequency band from the at least one combination of different carriers and/or frequency bands, a D2D operation with the second D2D enabled node; and
        perform, using a second carrier or a second frequency band from the at least one combination of different carriers and/or frequency bands, a cellular uplink operation.

4. The first D2D enabled node according to claim 3, wherein the control circuit is further configured to execute the one or more instructions stored in the memory to request the capability information from the second D2D enabled node.

5. A method performed at a first Device-to-Device (D2D) enabled node in a wireless communication network, the method comprising:
    transmitting, by the first D2D enabled node to a second D2D enabled node, capability information indicative of a combination of different carriers and/or frequency bands on which the first D2D enabled node is configured to perform simultaneous D2D and cellular operations;
    performing, by the first D2D enabled node, a D2D operation with the second D2D enabled node on a first carrier or a first frequency band from the combination of different carriers and/or frequency bands;
    performing, by the first D2D enabled node, a cellular downlink operation on a second carrier or a second frequency band from the combination of different carriers and/or frequency bands; and
    performing, by the first D2D enabled node, a cellular uplink operation on a third carrier or a third frequency band.

6. The method according to claim 5, further comprising transmitting, by the first D2D enabled node to a network node, the capability information regarding capabilities of the first D2D enabled node.

7. A method performed at a first Device-to-Device (D2D) enabled node, the method comprising:
    receiving, from a second D2D enabled node, capability information indicating at least one combination of different carriers and/or frequency bands on which the second D2D enabled node is configured to simultaneously perform D2D and cellular operations, wherein the second D2D enabled node performs a D2D operation using a first carrier or a first frequency band from the at least one combination of different carriers and/or frequency bands, and the second D2D enabled node performs a cellular uplink operation using a second carrier or a second frequency band from the at least one combination of different carriers and/or frequency bands.

8. The method according to claim 7, further comprising requesting the capability information from the second D2D enabled node.

9. A first network node in a wireless communication network, the first network node configured to:
    receive, from a second network node, a capability indication, which comprises capability information of a Device-to-Device (D2D) enabled node, wherein the capability information indicates at least one combination of different carriers and/or frequency bands; and configure, based on the capability information, the D2D enabled node for simultaneous D2D and cellular operations, wherein the simultaneous D2D and cellular operations include a D2D operation performed on a first carrier or a first frequency band from the at least one combination of different carriers and/or frequency bands, and a cellular operation performed on a second carrier or a second frequency band from the at least one combination of different carriers and/or frequency bands.

10. The first network node according to claim 9, wherein the first network node is further configured to use the capability information for one or more radio operational tasks.

11. A method for operating a first network node, the method comprising:
receiving, from a second network node, a capability indication, which comprises capability information of a Device-to-Device (D2D) enabled node, wherein the capability information indicates at least one combination of different carriers and/or frequency bands; and
configuring, based on the capability information, the D2D enabled node for simultaneous D2D and cellular operations, wherein the simultaneous D2D and cellular operations include a D2D operation performed on a first carrier or a first frequency band from the at least one combination of different carriers and/or frequency bands, and a cellular operation performed on a second carrier or a second frequency band from the at least one combination of different carriers and/or frequency bands.

12. The method according to claim 11, the method further comprising using the capability information for one or more radio operational tasks.

13. A non-transitory computer-readable storage medium storing a computer program comprising program instructions that, when executed by a processor circuit of a network node, configure the network node to:
receive, from a first Device-to-Device (D2D) enabled node, a capability indication, which comprises capability information of a second D2D enabled node, wherein the capability information indicates at least one combination of different carriers and/or frequency bands that the second D2D enabled node is adapted to be configured for simultaneous D2D and cellular operations; and
configure the first D2D enabled node to perform the simultaneous D2D and cellular operations using the at least one combination of different carriers and/or frequency bands.

* * * * *